US012243369B2

(12) United States Patent
Morishita et al.

(10) Patent No.: US 12,243,369 B2
(45) Date of Patent: Mar. 4, 2025

(54) COIN HANDLING DEVICE AND COIN HANDLING METHOD

(71) Applicant: GLORY LTD., Himeji (JP)

(72) Inventors: Ruka Morishita, Himeji (JP); Kouta Hashimoto, Himeji (JP); Kazuhiro Ohmatsu, Himeji (JP); Kazuya Tada, Himeji (JP)

(73) Assignee: Glory LTD., Hyogo (JP)

( * ) Notice: Subject to any disclaimer, the term of this patent is extended or adjusted under 35 U.S.C. 154(b) by 202 days.

(21) Appl. No.: 16/806,184

(22) Filed: Mar. 2, 2020

(65) Prior Publication Data

US 2020/0286321 A1 Sep. 10, 2020

(30) Foreign Application Priority Data

Mar. 5, 2019 (JP) ................................. 2019039941

(51) Int. Cl.
*G07D 11/28* (2019.01)
*G07D 3/00* (2006.01)
(Continued)

(52) U.S. Cl.
CPC ............... *G07D 11/28* (2019.01); *G07D 3/00* (2013.01); *G07D 5/005* (2013.01); *G07D 5/02* (2013.01);
(Continued)

(58) Field of Classification Search
CPC ............ G07D 5/08; G07D 3/00; G07D 5/005; G07D 5/02; G07D 9/002; G07D 2205/00;
(Continued)

(56) References Cited

U.S. PATENT DOCUMENTS 5,542,518 A * 8/1996 Kurosawa ................ G07D 7/12 356/71
6,039,645 A * 3/2000 Mazur ...................... G07D 3/00 453/10
(Continued)

FOREIGN PATENT DOCUMENTS

EP 1100051 A2 5/2001
JP 2000-76512 3/2000
(Continued)

OTHER PUBLICATIONS

Englsih Translation of JP 2000242822 A (Year: 2000).*
(Continued)

*Primary Examiner* — Jeffrey A Shapiro
(74) *Attorney, Agent, or Firm* — Renner, Kenner, Greive, Bobak, Taylor & Weber

(57) ABSTRACT

The present invention provides a coin handling device that enables a simple and easy change of a way of handling a coin of which a type is difficult to determine according to the user needs. The coin handling device includes a detector that detects a feature of a coin, a determiner that determines a type of the coin based on the feature of the coin detected by the detector, a reception unit that receives from an operating person handling settings that designate a way of handling the coin that is an indeterminate coin of which the type is not determined and for which multiple options of the type are extracted by the determiner, and a handling unit that handles the indeterminate coin based on the handling settings received by the reception unit.

7 Claims, 22 Drawing Sheets

(51) Int. Cl.

| | |
|---|---|
| ***G07D 5/00*** | (2006.01) |
| ***G07D 5/02*** | (2006.01) |
| ***G07D 5/08*** | (2006.01) |
| ***G07D 7/20*** | (2016.01) |
| ***G07D 9/00*** | (2006.01) |
| ***G07D 11/60*** | (2019.01) |

(52) U.S. Cl.
CPC ............. *G07D 5/08* (2013.01); *G07D 7/2075* (2013.01); *G07D 9/002* (2013.01); *G07D 11/60* (2019.01); *G07D 2205/00* (2013.01)

(58) Field of Classification Search
CPC . G07D 5/00; G07D 5/10; G07D 11/60; G07D 5/04; G07D 5/06; G07D 7/2075; G07D 7/2091; G07D 11/28
See application file for complete search history.

(56) References Cited

U.S. PATENT DOCUMENTS

| | | | | | |
|---|---|---|---|---|---|
| 6,171,182 | B1 * | 1/2001 | Geib | G07D 3/14 | 453/10 |
| 6,298,973 | B1 * | 10/2001 | Meade | G07D 5/08 | 194/318 |
| 7,600,626 | B2 * | 10/2009 | Hallowell | G07D 11/20 | 194/207 |
| 7,721,868 | B2 * | 5/2010 | Wilfer | G07D 11/28 | 194/302 |
| 8,739,955 | B1 * | 6/2014 | Everhart | G07D 5/00 | 194/207 |
| 8,929,640 | B1 * | 1/2015 | Mennie | G06Q 10/00 | 382/137 |
| 10,685,523 | B1 * | 6/2020 | Jagielinski | G07D 5/005 | |
| 11,017,273 | B2 * | 5/2021 | Morishita | G07D 5/005 | |
| 2004/0003980 | A1 * | 1/2004 | Hallowell | B65B 27/08 | 194/206 |
| 2004/0093117 | A1 * | 5/2004 | Daout | G07D 11/12 | 700/231 |
| 2007/0007105 | A1 * | 1/2007 | Itako | G07D 5/00 | 194/319 |
| 2007/0122023 | A1 * | 5/2007 | Jenrick | G07D 7/164 | 382/135 |
| 2009/0048803 | A1 * | 2/2009 | Zwieg | G07D 3/16 | 702/172 |
| 2010/0025911 | A1 * | 2/2010 | Sakamoto | G07D 11/28 | 271/9.01 |
| 2010/0312378 | A1 * | 12/2010 | Nakazumi | G07D 3/14 | 700/223 |
| 2011/0016965 | A1 * | 1/2011 | Sasaki | G07D 5/08 | 73/163 |
| 2011/0125641 | A1 * | 5/2011 | Kagehiro | G07F 19/202 | 705/43 |
| 2011/0184697 | A1 * | 7/2011 | Tada | G07D 5/02 | 702/173 |
| 2012/0047448 | A1 * | 2/2012 | Amidon | H04W 4/029 | 709/204 |
| 2012/0249780 | A1 * | 10/2012 | Mirumachi | G07D 5/005 | 348/E5.029 |
| 2012/0301009 | A1 * | 11/2012 | Dabic | G07D 3/14 | 382/136 |
| 2013/0261789 | A1 * | 10/2013 | Uezono | B07C 5/34 | 700/214 |
| 2014/0335770 | A1 * | 11/2014 | Martin | G07D 3/06 | 453/56 |
| 2015/0101907 | A1 * | 4/2015 | Hall | G07D 5/04 | 194/339 |
| 2016/0210529 | A1 * | 7/2016 | Nishiyuki | G06V 10/44 | |

FOREIGN PATENT DOCUMENTS

| | | | | | |
|---|---|---|---|---|---|
| JP | 2000242822 | A | * | 9/2000 | G07D 5/02 |
| JP | 2007058617 | A | * | 3/2007 | G07D 5/02 |
| KR | 100887875 | B1 | * | 3/2009 | G07D 3/00 |
| WO | WO 2004059584 | A1 | * | 7/2004 | G07D 7/12 |
| WO | WO 2018/066431 | A1 | * | 4/2018 | G06K 9/6267 |

OTHER PUBLICATIONS

Englsih Translation of JP 2007058617 A (Year: 2007).*
English Translation of WO 2018/066431 A1 (Year: 2018).*
KR 100887875 B1 English Translation (Year: 2009).*
WO 2004059584 A1 English Translation (Year: 2004).*
English Translation of KR 100887875 B1 (Year: 2009).*
English Translation of WO 2004059584 A1 (Year: 2004).*

* cited by examiner

FIG.1

| Type No. | Coin type | Multi-pass group No. | Multi-pass behavior setting | Magnetism template reference ID | Image template reference ID |
|---|---|---|---|---|---|
| 1 | 1 Yen | 1 | A:RJ | 1 | 1 |
| 2 | 100 Yen | 2 | A:RJ | 6 | 4 |
| 3 | New series 5 Yen | 3 | C:Setting order in priority | 2 | 2 |
| 4 | Old series 5 Yen | 3 | C:Setting order in priority | 3 | 2 |
| 5 | New series 10 Yen | 4 | B:Degree of similarity in priority | 4 | 3 |
| 6 | Old series 10 Yen | 4 | B:Degree of similarity in priority | 5 | 3 |
| … | … | … | … | … | … |

FIG.8

341

| Type information registration No. | Coin type | Pattern class | Magnetism template reference ID | Image template reference ID |
|---|---|---|---|---|
| 1 | 1 Yen | Obverse | 1 | 1 |
| 2 | 1 Yen | Reverse | 1 | 2 |
| 3 | New series 5 Yen | Obverse | 2 | 3 |
| 4 | New series 5 Yen | Reverse | 2 | 4 |
| 5 | Old series 5 Yen | Obverse | 3 | 5 |
| 6 | Old series 5 Yen | Reverse | 3 | 6 |
| 7 | New series 10 Yen | Obverse | 4 | 7 |
| 8 | New series 10 Yen | Reverse | 4 | 8 |
| 9 | Old series 10 Yen | Obverse | 5 | 9 |
| 10 | Old series 10 Yen | Reverse | 5 | 10 |
| 11 | 100 Yen | Obverse | 6 | 11 |
| 12 | 100 Yen | Reverse | 6 | 12 |
| ... | ... | ... | ... | ... |
| N-2 | Commemorative 500 yen | Common face | 16 | 20 |
| N-1 | Commemorative 500 yen | Nagano Pref. | 16 | 21 |
| N | Commemorative 500 yen | Hyogo Pref. | 16 | 22 |

FIG.9

342a

| Type No. | Coin type | Pattern class | Multi-pass group No. | Multi-pass behavior setting | Magnetism template reference ID | Image template reference ID |
|---|---|---|---|---|---|---|
| 1 | 1 Yen | Obverse | 1 | A:RJ | 1 | 1 |
| 2 | 1 Yen | Reverse | 1 | A:RJ | 1 | 2 |
| 3 | New series 5 Yen | Obverse | 2 | B:Degree of similarity in priority | 2 | 3 |
| 4 | New series 5 Yen | Reverse | 3 | B:Degree of similarity in priority | 2 | 4 |
| 5 | Old series 5 Yen | Obverse | 2 | B:Degree of similarity in priority | 3 | 5 |
| 6 | Old series 5 Yen | Reverse | 3 | B:Degree of similarity in priority | 3 | 6 |
| 7 | New series 10 Yen | Obverse | 4 | B:Degree of similarity in priority | 4 | 7 |
| 8 | New series 10 Yen | Reverse | 5 | B:Degree of similarity in priority | 4 | 8 |
| 9 | Old series 10 Yen | Obverse | 4 | B:Degree of similarity in priority | 5 | 7 |
| 10 | Old series 10 Yen | Reverse | 5 | B:Degree of similarity in priority | 5 | 8 |
| 11 | 100 Yen | Obverse | 6 | C:Setting order in priority | 6 | 11 |
| 12 | 100 Yen | Reverse | 7 | C:Setting order in priority | 6 | 12 |
| 13 | 100 Yen | Reverse (year 2000) | 7 | C:Setting order in priority | 6 | 13 |
| … | … | … | … | … | … | … |

FIG.10

| Result from determiner | Mode | I | II | III | IV |
|---|---|---|---|---|---|
| | Multi-pass behavior setting | A | B | C<br>New series coin in priority | C<br>Old series coin in priority |
| Determined as new series coin | | New series coin | New series coin | New series coin | New series coin |
| Both new series and old series coins extracted | | Rejected (not accepted) | Higher degree of similarity (new series/old series) | New series coin | Old series |
| Determined as old series coin | | Old series | Old series | Old series | Old series |

FIG.11

| Type No. | Result from determiner | Transport destination setting |
|---|---|---|
| 1 | 1 Yen | Rejecter |
| 2 | 100 Yen | Rejecter |
| 3 | New series 5 Yen | 5 Yen storage |
| 4 | 5 Yen with both new series and old series coins extracted | Unfit coin storage |
| 5 | Old series 5 Yen | Unfit coin storage |
| 6 | New series 10 Yen | 10 Yen storage |
| 7 | 10 Yen with both new series and old series coins extracted | Unfit coin storage |
| 8 | Old series 10 Yen | Unfit coin storage |
| ... | ... | ... |

FIG.12

| Result from determination processor | Mode | I | II | III | IV | V | VI | VII | VIII |
|---|---|---|---|---|---|---|---|---|---|
| | Multi-pass behavior setting | A | B | C | | | C | | |
| | | | | Only when determined as new series coin | | | Only when determined as old series coin | | |
| Determined as new series coin | | New series coin storage | New series coin storage | New series coin storage | New series coin storage | New series coin storage | New series coin storage | New series coin storage | New series coin storage |
| Both new series and old series coins extracted | | Rejecter | New series coin storage or Unfit coin storage | New series coin storage | New series coin storage | Unfit coin storage | New series coin storage | New series coin storage | Unfit coin storage |
| Determined as old series coin | | Unfit coin storage | Unfit coin storage | New series coin storage | Unfit coin storage | Unfit coin storage | New series coin storage | Unfit coin storage | Unfit coin storage |

FIG.20

341

| Type information registered No. | Type | Magnetism template reference ID |
|---|---|---|
| 1 | 1 Yen | 1 |
| 2 | New series 5 Yen | 2 |
| 3 | Old series 5 Yen | 3 |
| 4 | New series 10 Yen | 4 |
| 5 | Old series 10 Yen | 5 |
| 6 | 100 Yen | 6 |
| ... | ... | ... |
| ... | ... | ... |
| N | Commemorative 500 yen | 20 |

FIG.21

342a

| Type No. | Coin type | Multi-pass group No. | Multi-pass behavior setting | Template reference ID |
|---|---|---|---|---|
| 1 | 1 Yen | 1 | A:RJ | 1 |
| 2 | 100 Yen | 2 | A:RJ | 6 |
| 3 | New series 5 Yen | 3 | C:Setting order in priority | 2 |
| 4 | Old series 5 Yen | 3 | C:Setting order in priority | 3 |
| 5 | New series 10 Yen | 4 | C:Setting order in priority | 4 |
| 6 | Old series 10 Yen | 4 | C:Setting order in priority | 5 |
| ... | ... | ... | ... | ... |
| N | New series 500 Yen | 7 | A:RJ | 16 |

FIG.22

342a

| Type No. | Coin type | Multi-pass group No. | Multi-pass behavior setting | Template reference ID |
|---|---|---|---|---|
| 1 | 1 Yen | 1 | A:RJ | 1 |
| 2 | 100 Yen | 2 | A:RJ | 6 |
| 3 | New series 5 Yen | 3 | A:RJ | 2 |
| 4 | Old series 5 Yen | 3 | A:RJ | 3 |
| 5 | New series 10 Yen | 4 | A:RJ | 4 |
| 6 | Old series 10 Yen | 4 | A:RJ | 5 |
| ... | ... | ... | ... | ... |
| N | New series 500 Yen | 7 | A:RJ | 16 |

COIN HANDLING DEVICE AND COIN HANDLING METHOD

CROSS-REFERENCE TO RELATED APPLICATIONS

The present application claims priority under 35 U.S.C. § 119 to Japanese Patent Application No. 2019-039941 filed on Mar. 5, 2019, the contents of which are incorporated herein by reference in their entirety.

BACKGROUND OF THE INVENTION

Field of the Invention

The present invention relates to coin handling devices and coin handling methods.

Discussion of the Background

Conventionally known coin depositing and dispensing machines include coin handling machines such as cash settlement apparatus, money change dispensers, and automated teller machines (ATMs). For example, JP 2000-76512 A discloses a coin handling device including first and second recognizing means for recognizing the authenticity and denomination of a coin fed, first and second judging means for judging the abilities of the first and second recognizing means to recognize the coin, and a determining means for determining the authenticity and denomination of the coin while giving priority to recognition results of the first or second recognizing means having a higher recognizing ability based on judging results by the first and second judging means.

SUMMARY OF INVENTION

For example, a coin handling device detects features of a coin such as the diameter, material, presence of a hole, thickness, and pattern by one or both of a magnetic sensor and an image sensor, and determines the properties such as the denomination based on these detection results. In the case of 5 yen coins, not only non-rare (abundant), common 5 yen coins currently issued but also rare, old series 5 yen coins are present and circulate in the market. The main difference between these two types of 5 yen coins is the form of the characters engraved on each coin, and therefore these types are difficult to distinguish from each other using a coin handling device. Both the new and old types may be mentioned as options and the device may fail to determine the type of each coin. Similarly in the case of 10 yen coins, not only non-rare (abundant), common 10 yen coins currently issued but also rare, old series 10 yen coins are present and circulate in the market. The main difference between these two types of 10 yen coins is the presence or absence of reeds carved on the edge of each coin, and therefore these types are difficult to distinguish from each other. Both the new and old types may be mentioned as options and the device may fail to determine the type of each coin. Herein, the non-rare (abundant), common coins currently issued are also referred to as new series coins in comparison with the old series coins.

When a coin fed into a coin handling device is an old series coin, some financial markets may have to take the old series coin into the coin handling device and prevent recirculation thereof. In contrast, some vending machines may have to accept an old series coin, like new series coins, so as to enable product purchase even using an old series coin. As described, on the one hand, there is a need for active elimination of old series coins, but on the other hand, there is a need for giving priority to wide acceptance of coins including old series coin over elimination of old series coins. Accordingly, when a coin handling device is used to determine the type of a coin of which new series and old series coins circulate and both the new series coin and the old series coin are mentioned as options of the type of the coin, the preferentially selected result among these is different from user to user. In conventional cases, coin handling devices are customized with software particularly prepared for the respective users.

In response to the above current state of the art, an object of the present invention is to provide a coin handling device and a coin handling method each enabling a simple and easy change of a way of handling a coin of which the type is difficult to determine according to the user needs.

In order to solve the above issue and to achieve the object, one aspect of the present invention is directed to a coin handling device including: a detector that detects a feature of a coin; a determiner that determines a type of the coin based on the feature of the coin detected by the detector; a reception unit that receives from an operating person handling settings that designate a way of handling the coin that is an indeterminate coin of which the type is not determined and for which multiple options of the type are extracted by the determiner; and a handling unit that handles the indeterminate coin based on the handling settings received by the reception unit.

In another aspect of the present invention, the detector may include a magnetic sensor that detects a magnetic feature of the coin.

In another aspect of the present invention, the detector may include an image sensor that detects an optical feature of the coin.

In another aspect of the present invention, the multiple options of the type may have the same denomination.

In another aspect of the present invention, the handling settings may include a setting item that designates the indeterminate coin as a coin to be subjected to rejection handling, and the handling unit may perform the rejection handling on the indeterminate coin.

In another aspect of the present invention, the handling settings may include a setting item that designates the indeterminate coin as a coin of a type having a highest degree of similarity among the multiple options of the type, and the handling unit may handle the indeterminate coin as a coin of the type having the highest degree of similarity among the multiple options of the type.

In another aspect of the present invention, the multiple options of the type may include a rare type and a non-rare type that is equal in denomination to the rare type, the handling settings may include a setting item that designates a transport destination of the indeterminate coin to a transport destination of a coin of the non-rare type, and the handling unit may perform handling of transporting the indeterminate coin to the same transport destination as that of a coin of the non-rare type.

In another aspect of the present invention, the multiple options of the type may include a rare type and a non-rare type that is equal in denomination to the rare type, the handling settings may include a setting item that designates a transport destination of the indeterminate coin to a transport destination different from that of a coin of the non-rare type, and the handling unit may perform handling of transporting the indeterminate coin to the transport destination different from that of a coin of the non-rare type.

In another aspect of the present invention, the handling settings may include a setting item that designates a degree of priority of the type of the indeterminate coin, and the handling unit may handle the indeterminate coin as a coin of a type having a highest degree of priority among the multiple options of the type.

In another aspect of the present invention, the multiple options of the type may include a rare type and a non-rare type having the same denomination as the rare type, the setting item may designate the non-rare type to have a higher degree of priority than the rare type, and the handling unit may handle the indeterminate coin as a coin of the non-rare type.

In another aspect of the present invention, the handling settings may include a setting item that designates a transport destination of the indeterminate coin to a transport destination of a coin of the non-rare type, and the handling unit may perform handling of transporting the indeterminate coin to the same transport destination as that of a coin of the non-rare type.

In another aspect of the present invention, the handling settings may include a setting item that designates a transport destination of the indeterminate coin to a transport destination different from that of a coin of the non-rare type, and the handling unit mayperform handling of transporting the indeterminate coin to the transport destination different from that of a coin of the non-rare type.

In another aspect of the present invention, the multiple options of the type may include a rare type and a non-rare type that is equal in denomination to the rare type, the setting item may designate the rare type to have a higher degree of priority than the non-rare type, and the handling unit may handle the indeterminate coin as a coin of the rare type.

In another aspect of the present invention, the handling settings may include a setting item that designates a transport destination of the indeterminate coin to a transport destination of a coin of the non-rare type, and the handling unit may perform handling of transporting the indeterminate coin to the same transport destination of a coin of the non-rare type.

In another aspect of the present invention, the handling settings may include a setting item that designates a transport destination of the indeterminate coin to a transport destination different from that of a coin of the non-rare type, and the handling unit may perform handling of transporting the indeterminate coin to the transport destination different from that of a coin of the non-rare type.

Another aspect of the present invention is directed to a coin handling method including: detecting a feature of a coin; determining a type of the coin based on the feature of the coin detected in the detecting; receiving from an operating person handling settings that designate a way of handling the coin that is an indeterminate coin of which the type is not determined and for which multiple options of the type are extracted in the determining; and handling the indeterminate coin based on the handling settings received in the receiving.

Another aspect of the present invention is directed to a coin recognition device including a magnetic sensor that detects a magnetic feature of a coin, a magnetism determiner that determines multiple options of a type of the coin based on the magnetic feature of the coin detected by the magnetic sensor, an image sensor that images a surface of the coin, and an image determiner that determines the type of the coin among the multiple options of the type determined by the magnetism determiner based on an image of the coin imaged by the image sensor.

In another aspect of the present invention, the coin recognition device may further include a denomination determiner that determines the type of the coin based on the multiple options from the magnetism determiner and a determination result from the image determiner.

The coin handling device and the coin handling method of the present invention enable a simple and easy change of a way of handling a coin of which the type is difficult to determine according to the user needs.

BRIEF DESCRIPTION OF DRAWINGS

FIG. 1 is a diagram of part of an exemplary setting table relating to determination processing used in a coin handling device of Embodiment 1.

FIG. 8 is a diagram of part of an exemplary type information table.

FIG. 9 is a diagram of part of another exemplary setting table relating to determination processing.

FIG. 10 is a diagram illustrating modes in the determination processing on coins.

FIG. 11 is a diagram of part of an exemplary setting table relating to transport handling.

FIG. 12 is a diagram illustrating modes in the transport handling on coins.

FIG. 20 is a diagram of part of another exemplary type information table.

FIG. 21 is a diagram of part of still another exemplary setting table relating to determination processing.

FIG. 22 is a diagram of part of still another exemplary setting table relating to determination processing.

DESCRIPTION OF EMBODIMENTS

Preferred embodiments of the coin handling device and the coin handling method of the present invention are described hereinbelow with reference to the drawings.

Embodiment 1

First, the summary of the coin handling device and the coin handling method in the present embodiment is described. For coins of which the type is difficult to recognize, such as new series and old series 5 yen coins and new series and old series 10 yen coins, the result preferentially selected therefrom for handling the coins in the coin handling device is different from user (or model on which the device is mounted) to user. In conventional cases, particular software is prepared for the respective users. In the present embodiment, a coin is to be handled based on handling settings flexibly customizable by an operating person when a recognizer of the coin handling device fails to specify the type of the coin to be handled and multiple options are present for the type. This enables appropriate customization of the way of handling a coin of which the type is difficult to recognize only by receiving a change of handling settings from an operating person without preparation of any particular software. Further, in the present embodiment, a setting table is devised for associating the types of coins with the specific contents of the handling settings, i.e., setting items, which enables easy customization of the handling settings. The setting items of the handling settings preferably include, but are not limited to, a setting item (e.g., the priority order of the recognition results to be replied) that designates how to determine the type of a coin of which the type is not determined to a single type. In this case, determination processing for determining the type of such a coin is executed based on the handling settings. The setting items of the handling settings also preferably include, but are not limited to, a setting item (e.g., transport destination of a coin) that designates how to transport a coin of which the type is not determined to a single type. In this case, transport handling of transporting such a coin is performed based on the handling settings.

Figure 2:
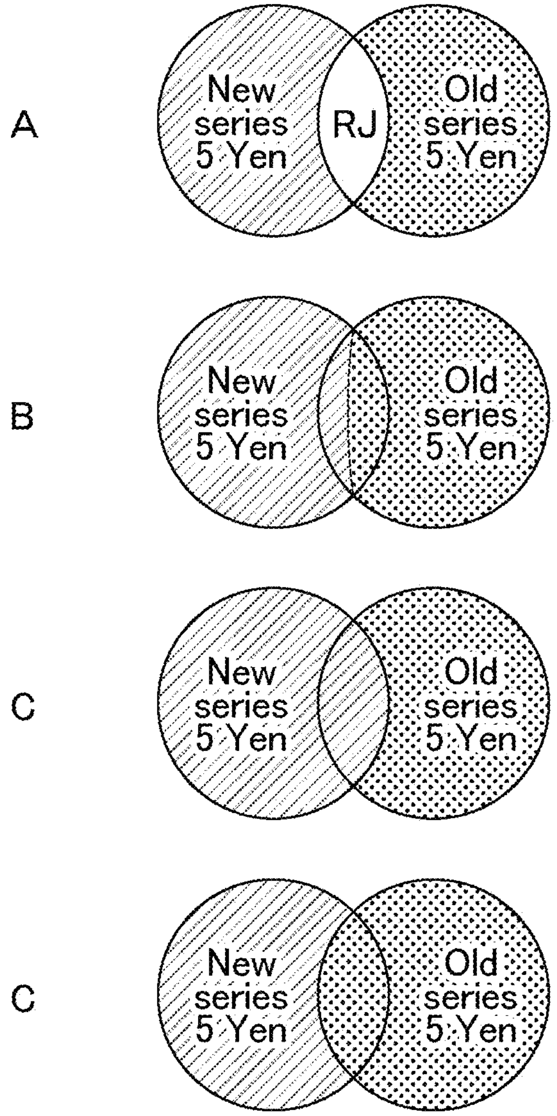
FIG. 2 is a diagram illustrating multi-pass behavior setting.

FIG. 1 is a diagram of part of an exemplary setting table relating to determination processing used in a coin handling device of Embodiment 1. FIG. 2 is a diagram illustrating multi-pass behavior settings. The setting table relating to determination processing includes the following items: type number, coin type, multi-pass group number, multi-pass behavior setting, magnetism template reference ID, and image template reference ID. For the magnetism template reference ID and the image template reference ID, each coin type is assigned an ID corresponding to the template of a magnetic feature obtained by a magnetic sensor and an ID corresponding to the template of an optical feature obtained by an image sensor. The multi-pass group number is a variable setting item and is the number to be referred when a coin to be handled is an indeterminate coin of which the type is not determined and for which multiple options of the type are extracted by the determiner of the recognizer. When the multi-pass group numbers of the multiple options of the type extracted are different from each other, the coin of interest is immediately determined as a coin to be rejected. When the multi-pass group numbers of the multiple options extracted are the same as each other, the coin of interest is determined based on the multi-pass behavior setting to be described later. That the type of a coin to be handled is not determined and multiple options of the type are extracted by the determiner of the recognizer is also referred to as that multi-pass occurs. The multi-pass behavior setting is selected from a plurality of options and is a variable setting item. This item designates how to determine a coin to be handled when multi-pass occurs. The type number is the number assigned to each coin type with the respective multi-pass group number, multi-pass behavior setting, magnetism template reference ID, and image template reference ID assigned thereto. In FIG. 1, the sequential numbers are assigned in ascending order from the top row to the bottom row.

In setting of the multi-pass group numbers, multi-pass group numbers are assigned to coins of the respective type numbers, as indicated in the setting table of FIG. 1. Specifically, the same multi-pass group number is assigned to groups in which coins are determined based on the multi-pass behavior setting when multi-pass occurs, while different multi-pass group numbers are assigned to groups in which coins are immediately determined as coins to be rejected when multi-pass occurs. For example, in FIG. 1, the same multi-pass group number 3 is assigned to the new series and old series 5 yen coins respectively having the magnetism template reference IDs 2 and 3. Thereby, when the determiner of the coin handling device fails to determine the type of a coin and extracts new series and old series 5 yen coins as options, the determination processor that executes determination processing on coins in the recognizer does not immediately determine the coin as a coin to be rejected but determines the coin based on the multi-pass behavior setting to be described later that designates the behavior in determining the coin. In contrast, in FIG. 1, different multi-pass group numbers are assigned to a 100 yen coin and a new series 5 yen coin respectively having the magnetism template reference IDs 6 and 2. Thereby, when the determiner of the coin handling device fails to determine the type of a coin and extracts a 100 yen coin and a new series 5 yen coin as options, the determination processor immediately determines the coin as a coin to be rejected.

The multi-pass behavior setting designates the way of determination processing on the respective types of coins when multi-pass occurs between the templates of the same multi-pass group number.

Specifically, a multi-pass behavior setting A illustrated in FIG. 1 and FIG. 2 is a setting in which the determination processor of the recognizer executes processing of determining an indeterminate coin as a coin to be rejected. A multi-pass behavior setting B is a setting in which the determination processor executes processing of determining an indeterminate coin as a coin of the type having the highest degree of similarity among multiple options of the type. A multi-pass behavior setting C is a setting in which the determination processor executes processing of determining an indeterminate coin as a coin of the type having the highest degree of priority among multiple options of the type. An operating person can change the multi-pass behavior setting among the multiple options (e.g., multi-pass behavior settings A to C). The degree of priority is determined by the type number in the setting table of FIG. 1. The smaller the type number is, the higher the degree of priority is.

The multi-pass behavior setting C may be assumed to include two cases where the type of a coin is not determined and new series and old series 5 yen coins are extracted as options, as illustrated in FIG. 2. One is the case where priority is given to the new series 5 yen coin and the coin of interest is determined as a new series 5 yen coin. The other is the case where priority is given to the old series 5 yen coin and the coin of interest is determined as an old series 5 yen coin.

The above described is the setting table relating to determination processing. In the present embodiment, a setting table relating to transport handling may also be used. The setting table relating to transport handling includes a setting item that, when the determiner of the recognizer determines a coin to be handled as an indeterminate coin, designates the transport destination of the indeterminate coin. Then, the setting item designates the device to perform rejection handling on the indeterminate coin, to store the indeterminate coin in a storage for new series coins, or to store the indeterminate coin in a storage for unfit coins. An operating person can select and change the setting item for designating the transport destination among multiple options.

The coin handling device in the present embodiment can handle a coin of which the type is difficult to determine based on the information in the setting table. The setting table can be rewritten by an operating person according to the user needs. In other words, the coin handling device in the present embodiment enables a simple and easy change of the way of handling a coin of which the type is difficult to determine using the setting table according to the user needs.

The appearance and internal structure of the coin handling device in the present embodiment are described hereinbelow.

Figure 3A:
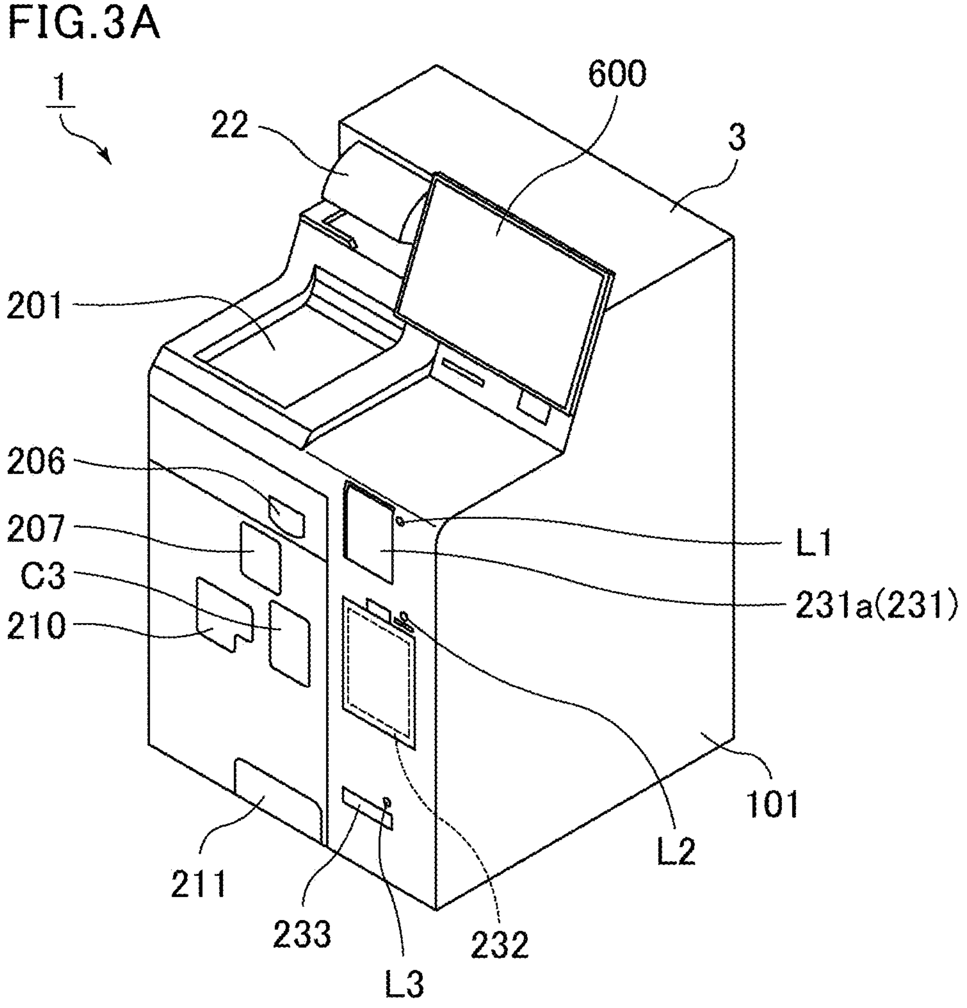
FIG. 3A is a schematic perspective view of the appearance of the coin handling device of Embodiment 1.
Figure 3B:
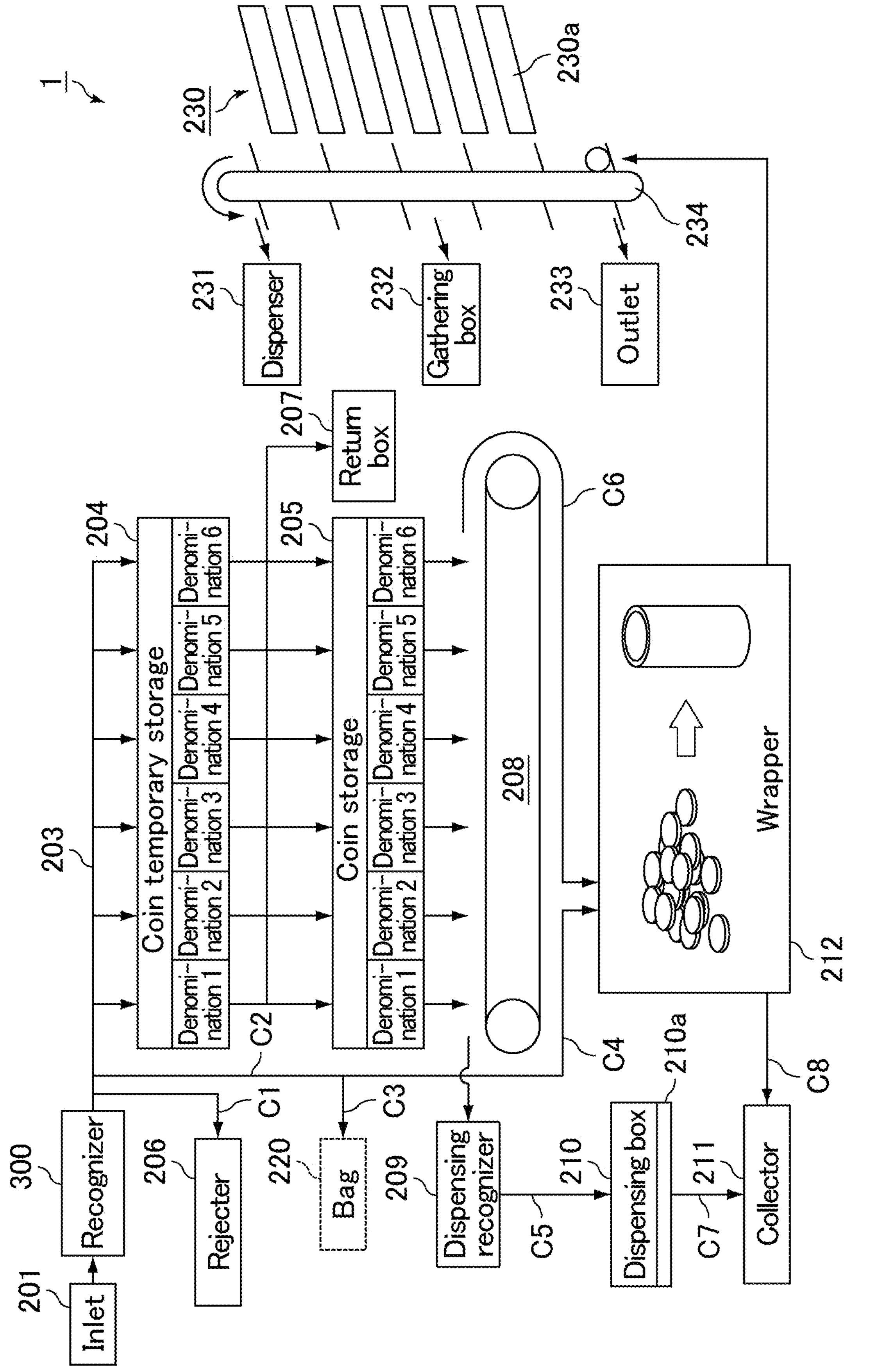
FIG. 3B is a schematic diagram of the structure of the coin handling device of Embodiment 1.
Figure 4:
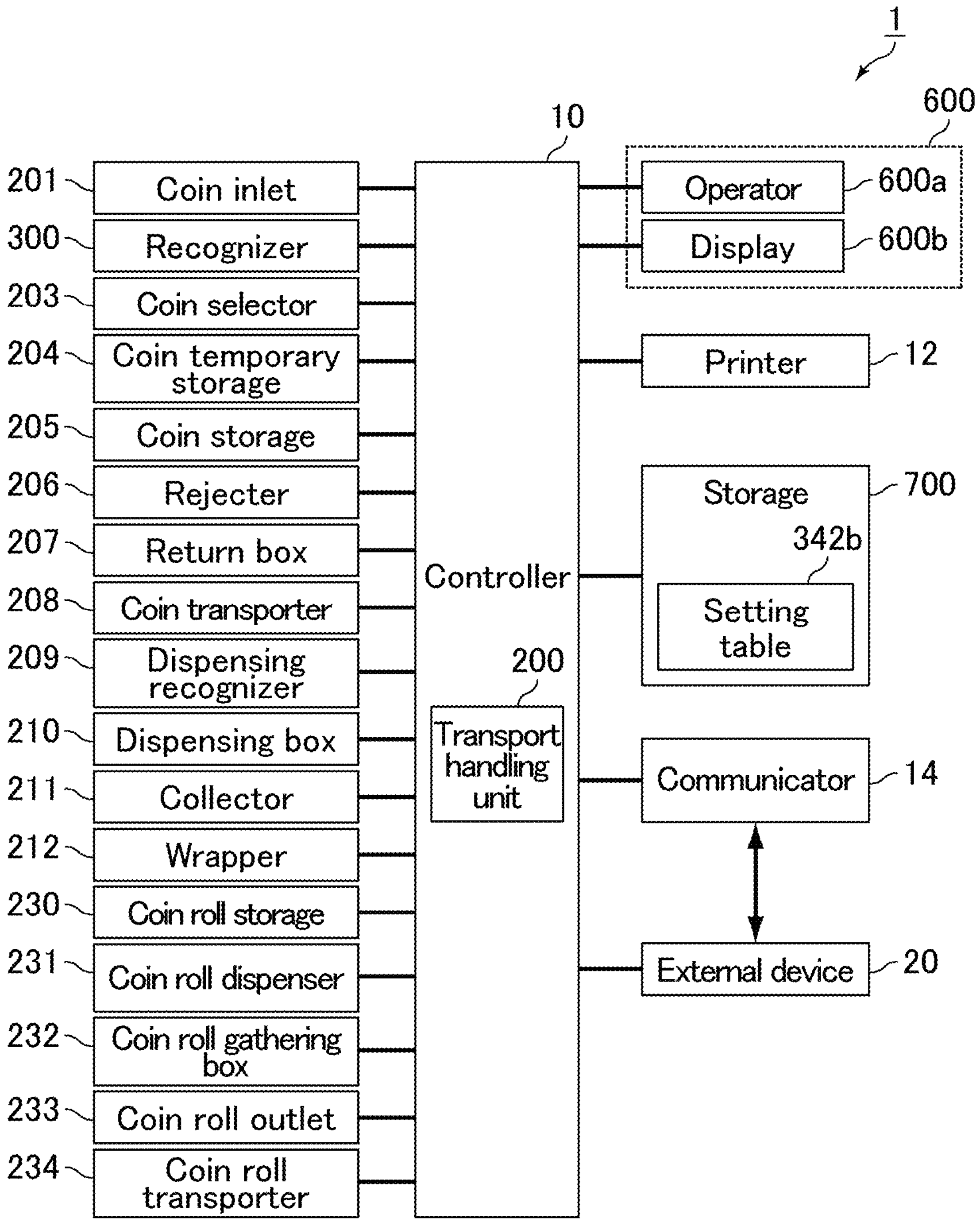
FIG. 4 is a block diagram of the internal structure of the coin handling device of Embodiment 1.

FIG. 3A is a schematic perspective view of the appearance of the coin handling device of Embodiment 1. FIG. 3B is a schematic diagram of the structure of the coin handling device of Embodiment 1. FIG. 4 is a block diagram of the internal structure of the coin handling device of Embodiment 1.

As illustrated in FIGS. 3A, 3B, and 4, a coin handling device 1 performs a variety of handling such as coin depositing and dispensing handling, formation of coin rolls, and coin roll dispensing handling. Each coin roll consists of a predetermined number of coins (e.g., 50 coins). The predetermined number of coins is wrapped by wrapping paper.

The coin handling device 1 includes a housing 3. The housing 3 is in the form of a cuboidal box. The coin handling device 1 includes a coin inlet 201, a recognizer 300, a coin selector 203, a coin temporary storage 204, a coin storage 205, a rejecter 206, a return box 207, a coin transporter 208, a dispensing recognizer 209, a dispensing box 210, a collector 211, a wrapper 212, a coin roll storage 230, a coin roll dispenser 231, a coin roll gathering box 232, a coin roll outlet 233, and a coin roll transporter 234. These components are accommodated in the housing 3. The coin handling device 1 also includes a controller 10, an operation display 600, a printer 12, a storage 700, and a communicator 14. The controller 10 includes a transport handling unit 200. The storage 700 stores as the handling settings a setting table 342*b* relating to transport handling.

The coin inlet 201 allows coins to be inserted. The coin inlet 201 allows the inserted coins to be fed one by one.

The recognizer 300 executes recognition processing (recognition of properties of a coin such as type, authenticity, and fitness) on a coin fed through the coin inlet 201. For example, the recognizer 300 includes a variety of sensors such as a magnetic sensor and an image sensor, a processor such as a CPU, and a storage such as a memory that stores programs and information for driving the processor. The results of the recognition processing by the recognizer 300 are transmitted to the controller 10 to be described later.

The coin selector 203 sorts the coins passed through the recognizer 300 and release them to the coin temporary storage 204. For example, the coin selector 203 may include a coin pathway for transporting coins, a transport belt for transporting coins on the coin pathway, and diverter holes which are provided on the coin pathway and through one of which the coin of interest is dropped and diverted. In the coin selector 203, a coin recognized as a coin that should be rejected (coin to be rejected) by the recognizer 300 is guided to the rejecter 206 through a return chute C1 provided below the coin selector 203. A coin recognized as corresponding to a coin designated in advance by the recognizer 300 passes through a coin chute C2 provided below the coin selector 203, and is then guided to a bag 220 mounted on a bag mounter provided on the front of the housing 3 through a bag inlet chute C3 provided below the coin chute C2 or is guided to the wrapper 212 through a direct wrapping chute C4 provided below the coin chute C2.

The coin temporary storage 204 temporarily stores the coins released from the coin selector 203 by denomination. The coin temporary storage 204 releases the temporarily stored coins to the coin storage 205 or the return box 207.

The coin storage 205 stores the coins released from the coin temporary storage 204 by denomination. Specific examples of the coin storage 205 include a 1 yen coin storage, a 5 yen coin storage, and a 10 yen coin storage. The coin storage 205 feeds the stored coins one by one by type to the coin transporter 208.

The rejecter 206 stacks the coins guided through the return chute C1 (i.e., the coins to be rejected).

The return box 207 stores the coins (coins that should be returned) released from the coin temporary storage 204. Specifically, the return box 207 is in the form of a cuboidal box with an upper opening. The return box 207 is removable from the housing 3 of the coin handling device 1 and is drawable from the front of the housing 3.

The coin transporter 208 transports the coins fed out of the coin storage 205 to the dispensing box 210 or the wrapper 212. In this example, the coin transporter 208 includes a conveyor that transports the coins in the depth direction (forward-backward direction) of the housing 3 and a feed-out mechanism (not shown) that feeds out the coins on the conveyor to the wrapper 212. The coins transported to the front edge of the coin transporter 208 (specifically, the conveyor) are guided to the dispensing box 210 through a dispensing chute C5 provided below the front edge of the coin transporter 208. The feed-out mechanism is provided at a central portion of the coin transporter 208 (specifically, the conveyor) in the forward-backward direction. The coins fed out of the feed-out mechanism are guided to the wrapper 212 through a wrapping chute C6 provided below the central portion of the coin transporter 208 in the forward-backward direction.

The dispensing recognizer 209 executes recognition processing and count processing on the coins under transport from the coin transporter 208 to the dispensing box 210. In the recognition processing, the dispensing recognizer 209 recognizes properties such as the type, authenticity, and fitness of the coins. In the count processing, the dispensing recognizer 209 counts the number of coins by type. For example, the dispensing recognizer 209 includes a variety of sensors such as a magnetic sensor and an image sensor, a processor such as a CPU, and a storage such as a memory that stores programs and information for driving the processor. The results of the recognition processing by the dispensing recognizer 209 are transmitted to the controller 10 to be described later.

The dispensing box 210 stores the coins (coins that should be fed out) fed out of the coin storage 205 and transported by the coin transporter 208. The dispensing box 210 releases the coins stored therein to the collector 211. Specifically, the dispensing box 210 is in the form of a cuboidal box with an upper opening, and includes a bottom plate 210*a* that can be opened and closed. The coins released from the dispensing box 210 as a result of opening the bottom plate 210*a* of the dispensing box 210 is guided to the collector 211 through a collect chute C7 provided below the dispensing box 210. The dispensing box 210 is removable from the housing 3 of the coin handling device 1, and is drawable from the front of the housing 3.

The collector 211 stores the coins that should be collected. Specifically, the collector 211 is in the form of a cuboidal box with an upper opening, and stores the coins released from the dispensing box 210 and guided through the collect chute C7 and the coins guided through a discharge chute C8 to be described later. The collector 211 is removable from the housing 3 of the coin handling device 1 and is drawable from the front of the housing 3.

The wrapper 212 forms coin rolls. Specifically, the wrapper 212 forms rolls of the coins fed out of the coin storage 205, transported by the coin transporter 208, and guided through the wrapping chute C6 (or the coins guided through the direct wrapping chute C4) and to release the resulting coin rolls to the coin roll transporter 234. In this example, the wrapper 212 is provided with a wrapping switcher 212*a* that can switch the wrapper 212 between the state of allowing release of the coin rolls to the coin roll transporter 234 and the state of inhibiting the release. The coins not used for formation of coin rolls by the wrapper 212 are guided to the collector 211 through the discharge chute C8 provided below the wrapper 212.

The coin roll storage 230 stores the coin rolls by denomination. The coin roll storage 230 transfers the coin rolls to/from the coin roll transporter 234. In this example, the coin roll storage 230 includes multiple (specifically, six) coin roll trays 230*a*. The multiple coin roll trays 230*a* store coin rolls of respective different denominations. The coin roll storage 230 is removable from the coin handling device 1 (specifically, the housing 3).

The coin roll dispenser 231 stacks the coin rolls (coin rolls that should be fed out) transported by the coin roll transporter 234. The coin roll dispenser 231 is provided with an outlet that opens on the front surface of the housing 3 of the coin handling device 1, and the outlet is provided with a shutter 231*a*. When the shutter 231*a* is opened, an operating person can take the coin rolls out of the coin roll dispenser 231. The coin handling device 1 includes a first light-emitter L1 near the coin roll dispenser 231. The first light-emitter L1 may include an LED, for example.

The coin roll gathering box 232 stacks the coin rolls transported by the coin roll transporter 234. The coin roll gathering box 232 has a larger stacking capacity than the coin roll dispenser 231. For example, the stacking capacity of the coin roll dispenser 231 may be set to stack about 16 coin rolls, while the stacking capacity of the coin roll gathering box 232 may be set to stack about 40 coin rolls. The coin roll gathering box 232 is removable from the coin handling device 1 (specifically, the housing 3). The coin roll gathering box 232 can switch between the locked state (the state of the box being not removable from the coin handling device 1) and the unlocked state. The coin handling device 1 includes a second light-emitter L2 near the coin roll gathering box 232. The second light-emitter L2 may include an LED, for example.

The coin roll outlet 233 feeds out the coin rolls transported by the coin roll transporter 234 to the outside of the coin handling device 1. The coin rolls fed out of the coin roll outlet 233 are stacked in a collection container (not shown) provided on the front of the coin handling device 1. The collection container used may be a container having a larger stacking capacity than the coin roll gathering box 232. The coin handling device 1 includes a third light-emitter L3 near the coin roll outlet 233. The third light-emitter L3 may include an LED, for example.

The coin roll transporter 234 is connected with the wrapper 212, the coin roll storage 230, the coin roll gathering box 232, the coin roll dispenser 231, and the coin roll outlet 233, and thereby transports the coin rolls.

The transport handling unit 200, one example of the handling unit, has functions of determining a way of transport handling on the coins (the transport destination of the coins) based on the determination result by the determination processor of the recognizer 300 to be described later and the setting table 342*b* relating to transport handling stored in the storage 700 and of controlling the coin selector 203 and the coin temporary storage 204. The transport handling unit 200 is realized by allowing a processor such as a CPU to execute a predetermined program stored in the storage 700.

The operation display 600 includes an operator 600*a* and a display 600*b*. The operator 600*a* allows an operating person to operate the system and to receive the input information corresponding to the operation by the operating person. As a result of operating the operator 600*a*, the operating person can make the coin handling device 1 perform and execute a variety of handling and processing. In other words, the coin handling device 1 works in response to the operation input to the operator 600*a* by the operating person. The display 600*b* displays a variety of information such as the status of handling and processing the coins in the coin handling device 1 and an operation screen for receiving operation inputs. For example, the operation display 600 may include a touch screen. As described, the operation display 600 functions as a reception unit that receives operation information input by an operating person.

The printer 12 prints on a receipt a variety of information such as the status of handling and processing the coins in the coin handling device 1 and the inventory amount of the coins and to issue the receipt with the variety of information printed. The storage 700 stores a variety of information such as information relating to the status of handling and processing the coins in the coin handling device 1, information relating to the inventory amount of the coins in the coin handling device 1, image information such as the operation screen displayed on the operation display 600, and control information for controlling the operation of the coin handling device 1. For example, the storage 700 may include a general-purpose storage device such as a hard disk drive or a flash memory. The communicator 14 is provided to establish wired or wireless communication between the controller 10 and an external device 20 such as a tablet device or a smartphone.

The controller 10 transmits/receives signals to/from the respective components of the coin handling device 1. The controller 10 can communicate with the external device 20 through the communicator 14.

In order to allow the coin handling device 1 to perform and execute a variety of handling and processing, the controller 10 controls the respective components of the coin handling device 1 and thereby to control the operation of the coin handling device 1 based on the operation input through the operation display 600 (specifically, the operator 600*a*) and signals and information received from the respective components of the coin handling device 1 or the external device 20. For example, the controller 10 may include a processor such as a CPU and a storage such as a memory that stores programs and information for operating the processor.

The recognizer 300 of the coin handling device 1 is specifically described hereinbelow.

Figure 5:
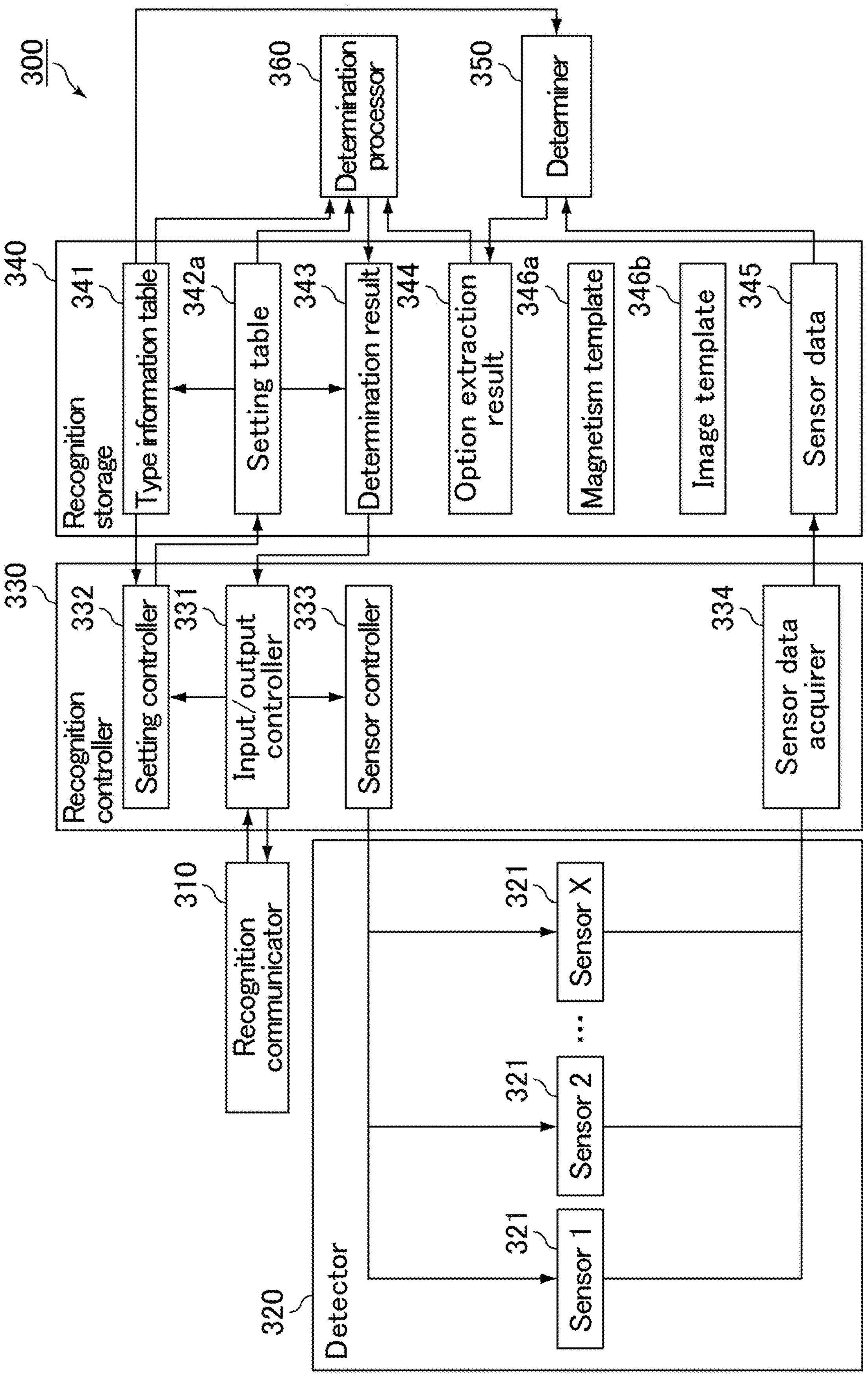
FIG. 5 is a block diagram of the internal structure of a recognizer in the coin handling device of Embodiment 1.

FIG. 5 is a block diagram of the internal structure of a recognizer in the coin handling device of Embodiment 1. The recognizer 300 includes a recognition communicator 310, a detector 320, a recognition controller 330, a recognition storage 340, a determiner 350, and a determination processor 360. The recognition controller 330, the determiner 350, and the determination processor 360 are realized by allowing a processor such as a CPU to execute a predetermined program stored in the recognition storage 340.

The recognition communicator 310 has a function of transmitting/receiving the information to/from the controller 10.

The detector 320 has a function of detecting a feature of a coin. The detector 320 is provided with multiple sensors 321. Specific examples of the sensors 321 include a magnetic sensor that detects a magnetic feature of a coin and an image sensor that images a coin. The detector 320 may include either or both of the magnetic sensor and the image sensor.

Figure 6:
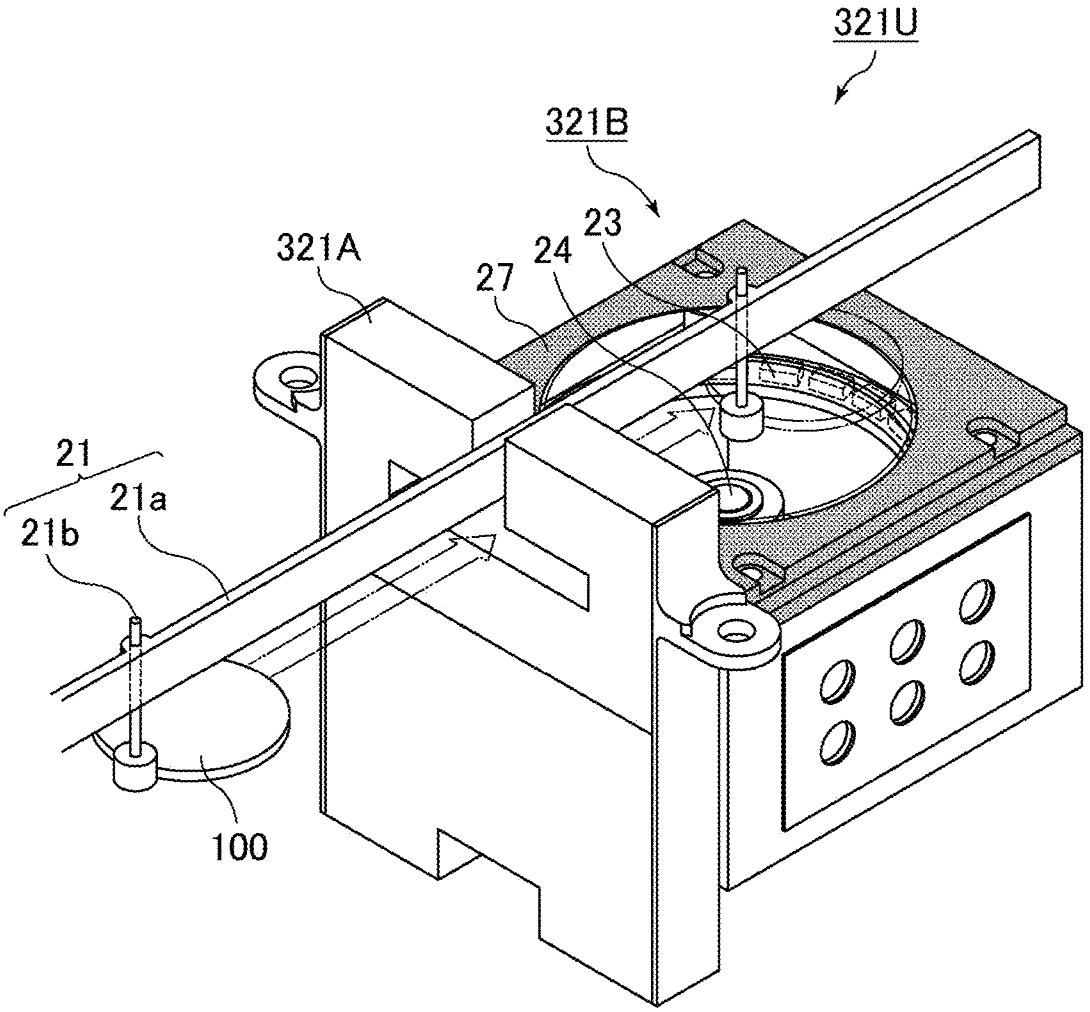
FIG. 6 is a schematic perspective view of a sensor unit including a magnetic sensor and an image sensor of the coin handling device of Embodiment 1.
Figure 7:
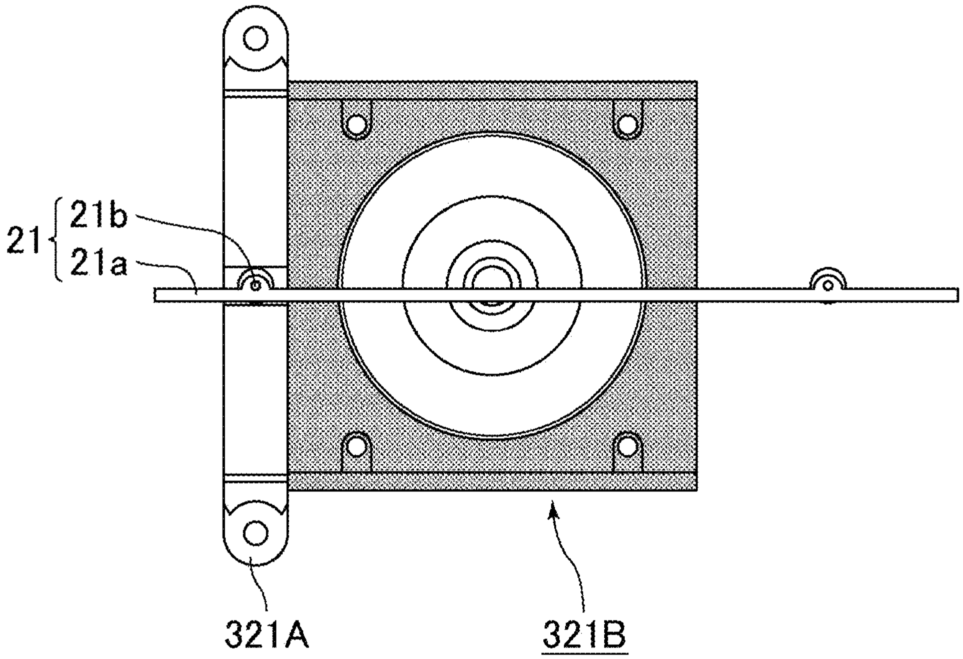
FIG. 7 is a schematic plan view of the sensor unit including the magnetic sensor and the image sensor of the coin handling device of Embodiment 1.

FIG. 6 is a schematic perspective view of a sensor unit included in the recognizer of the coin handling device of Embodiment 1. FIG. 7 is a schematic plan view of the sensor unit included in the recognizer of the coin handling device of Embodiment 1. As illustrated in FIG. 6, a sensor unit 321U includes a magnetic sensor 321A and an image sensor 321B in the stated order from the upstream to the downstream of the transport path on which coins 100 are to be transported, and is an assembly of these multiple sensors. The arrow in the FIG. 6 indicates the direction of transporting coins 100 on the transport path.

As illustrated in FIG. 6, the recognizer includes as means for transporting coins 100 a transport belt 21*a* stretched along the transport path above the transport surface and transport pins 21*b* fixed relative to the transport belt 21*a* at regular intervals. The transport belt 21*a* is driven by a driving device including a motor, for example. The transport pins 21*b* each in the form of a cylinder come into contact with the edge of each coin 100 and the transport belt 21*a* moves, whereby coins 100 are transported one by one at intervals on the transport path. The structure of the means for transporting coins 100 is not limited to the structure illustrated as long as it can transport coins 100. The structure may not include any transport pin 21*b* and may consist of the transport belt 21*a*.

The magnetic sensor 321A includes an AC power supply, an exciting coil, and a detection coil. The exciting coil generates a magnetic field on the transport path in response to an AC voltage applied from the AC power supply. The detection coil outputs a detection signal based on a voltage induced by the magnetic field generated by the exciting coil. The detection coil then outputs a detection signal based on a voltage induced by the magnetic field changed as a result of transport of a coin 100 on the transport path.

As illustrated in FIG. 7, the image sensor 321B includes a circular planar transparent portion corresponding to an imaging area 22*a* and, below the transparent portion, a light source that illuminates the imaging area 22*a* and an imaging element 24 that images the imaging area 22*a*. When a coin 100 enters the imaging area 22*a*, the light source emits light toward the imaging area 22*a* (the transparent portion) and the imaging element 24 receives the light reflected on a surface (one of the surfaces) of the coin 100 under transport to form an image. Thereby, an image of the coin 100 is collected.

The recognition controller 330 has a function of controlling the components in the recognizer 300. The recognition controller 330 includes an input/output controller 331, a setting controller 332, a sensor controller 333, and a sensor data acquirer 334. The input/output controller 331 controls transmission and reception of information between the recognition communicator 310 and the controller 10. The setting controller 332 has a function of changing the information in the setting table stored in the recognition storage 340 based on the information from the input/output controller 331. In other words, the setting controller 332 receives from the input/output controller 331 the information relating to a change of the setting table input by an operating person through the operation display 600 and changes the setting table in accordance with the information received. The sensor controller 333 has a function of controlling the detector 320. The sensor data acquirer 334 has functions of acquiring data of a feature of a coin acquired by the detector 320, of converting the data into data that can be compared with the reference data of the template stored in the recognition storage 340, and of storing the converted data as sensor data 345 in the recognition storage 340.

The recognition storage 340 has a function of storing a type information table 341, a setting table 342*a* relating to determination processing, a determination result 343, an option extraction result 344, the sensor data 345, a magnetism template 346*a*, an image template 346*b*, and the like.

FIG. 8 is a diagram of part of an exemplary type information table. The type information table 341 of FIG. 8 is a table in which each type of coins are assigned a magnetism template reference ID and an image template reference ID. The magnetism template reference ID is the number that associates the type of a coin with the magnetism template corresponding to the type. The magnetism template includes the reference data and threshold of a magnetic feature. The image template reference ID is the number that associates the type of a coin with the image template corresponding to the type. The image template includes the data and threshold relating to the reference image. The letter N in the tables herein means the total number of types of coins registered.

FIG. 9 is a diagram of part of another exemplary setting table relating to determination processing. The setting table 342*a* relating to determination processing illustrated in FIG. 9 includes the following items: type number, coin type, pattern class, multi-pass group number, multi-pass behavior setting, magnetism template reference ID, and image template reference ID. In addition to the type number, coin type, multi-pass group number, multi-pass behavior setting, magnetism template reference ID, and image template reference ID as in the setting table illustrated in FIG. 1, the setting table 342*a* also includes the item of pattern class that indicates the obverse or reverse of a coin.

For the setting item "multi-pass group number" of the setting table 342*a*, different multi-pass group numbers are assigned to groups in which coins are immediately determined as coins to be rejected when the determiner 350 fails to determine the type of a coin and extracts multiple options of the type, while the same multi-pass group number is assigned to groups in which coins are not immediately determined as coins to be rejected and the behavior in handling the coins of interest is to be customized. The multi-pass group numbers assigned to the respective types of coins can be determined by an operating person through the operation display 600.

The setting item "multi-pass behavior setting" in the setting table 342*a* designates the way of determination processing on a coin to be handled which is an indeterminate coin of which the type is not determined and for which multiple options of the type are extracted by the determiner 350 with the multiple options of the type being assigned the same multi-pass group number.

FIG. 10 is a diagram illustrating modes in the determination processing on coins. The determination processor 360, another example of the handling unit, executes the determination processing in any of the four modes illustrated in FIG. 10, specifically, a mode I in which an indeterminate coin is determined as a coin to be rejected; a mode II in which an indeterminate coin is determined as a coin of the type having the highest degree of similarity among multiple options of the type; and modes III and IV in each of which an indeterminate coin is determined as a coin of the type having the highest degree of priority among multiple options of the type. The mode III is the case where the new series coin has a higher degree of priority, while the mode IV is the case where the old series coin has a higher degree of priority.

The determination result 343 is a result of the determination processing by the determination processor 360 and includes the information of whether multi-pass occurs or not.

The option extraction result 344 is a result of extracting options of the type for one or more types of coins by the determiner 350.

The determiner 350 has a function of identifying the type of a coin based on the feature of the coin detected by the detector 320. Specifically, the determiner 350 compares the detection data from the detector 320 with each of the templates, and calculates the degree of similarity. When the calculated degree of similarity is within the tolerance relative to the threshold, the template ID is searched in the type information table 341, the corresponding type is extracted as an option of the type of the coin of interest, and it is stored as the option extraction result 344 in the storage 340.

When the option extraction result 344 includes a single type, the determination processor 360 determines the coin of interest as a coin of this type. When the option extraction result 344 includes multiple types, the determination processor 360 executes the determination processing on the indeterminate coin based on the setting table relating to determination processing.

New series coins and old series coins having the same denomination may be difficult to distinguish from each other as different types of coins. There are a variety of ways of handling new series coins and old series coins having the same denomination according to the user needs. The coin handling device in the present embodiment enables a simple and easy change of the way of handling a coin of which the type is difficult to determine according to the user needs, and thus can favorably be used even in the case where the multiple options of the type have the same denomination.

In the recognizer 300, the determination processor 360 utilizes the setting table 342*a* relating to determination processing to execute determination processing on a coin. In the transport handling unit 200, as described above, the transport handling on a coin is performed based on the determination result by the determination processor 360 and the setting table 342*b* relating to transport handling. FIG. 11 is a diagram of part of an exemplary setting table relating to transport handling. In the setting item "transport destination setting" in the setting table 342*b* relating to transport handling illustrated in FIG. 11, the transport destination of each coin is selected among multiple options. In the example of FIG. 11, the selection is performed as follows. When the result from the determiner 350 indicates that the coin of interest is a new series 5 yen coin, the coin is to be stored in the 5-yen storage; when the determiner 350 extracts both a new series and old series 5-yen coins as options, the coin is to be stored in the unfit coin storage; and when the result from the determiner 350 indicates that the coin of interest is an old series 5 yen coin, the coin is to be stored in the unfit coin storage.

FIG. 12 is a diagram illustrating modes in the transport handling on coins. In FIG. 12, the transport destination is set for each coin. The transport handling unit 200 performs the transport handling in any of eight modes (modes I to VIII) indicated in FIG. 12. For example, a mode II is a mode in which, when the determination processor 360 determines an indeterminate coin, for which both new series and old series coins are extracted, as a coin having the higher degree of similarity among the new series and old series coins (in the case of the multi-pass behavior setting B), the coin is to be stored in the new series coin storage or the unfit coin storage. In this case, whether the coin is stored in the new series coin storage or the unfit coin storage can be set by an operating person as appropriate. In the mode II, a coin determined as a new series coin without multi-pass is stored in the new series coin storage, while a coin determined as an old series coin without multi-pass is stored in the unfit coin storage.

The modes III to V are each a mode of transport handling in which the multi-pass behavior setting relating to determination processing is C and the new series coin has a higher degree of priority than the old series coin. The modes VI to VIII are each a mode of transport handling in which the multi-pass behavior setting relating to determination processing is C and the old series coin has a higher degree of priority than the new series coin. The transport destination settings may not be consistent with the determination result from the determination processor. For example, when the multi-pass behavior setting is C and the new series coin has a higher degree of priority than the old series coin, the coin of interest for which both new series and old series coins are extracted by the determiner 350 is to be stored in the new series coin storage in the mode IV, while it is to be stored in the unfit coin storage in the mode V. As described, the transport destination of an indeterminate coin may be consistent or inconsistent with the result from the determination processor 360.

A new series coin and an old series coin may have slightly different thicknesses. The coexistence of them may cause inappropriate coin wrapping. Still, in the mode II (limited to the setting in which coins are to be stored in the unfit coin storage when both new series and old series coins are extracted), mode V, and mode VIII in FIG. 12, coins to be handled are to be stored in the new series coin storage only when they are determined as new series coins by the determiner 350, while old series coins are excluded. Thus, coin wrapping can be performed as appropriate.

The modes III, IV, VI, and VII in FIG. 12 are settings in which coins are to be stored in the new series coin storage when the determiner 350 extracts both new series and old series coins. This can therefore increase the coin reception rate.

The unfit coin storage used may be the return box 207. In this case, the transport handling unit 200 controls the coin selector 203 and the coin temporary storage 204 based on the determination result from the determination processor 370 and the setting table 342*b* relating to transport handling, and the coin selector 203 and the coin temporary storage 204 transport coins that should be stored in the unfit coin storage to the return box 207.

Figure 13:
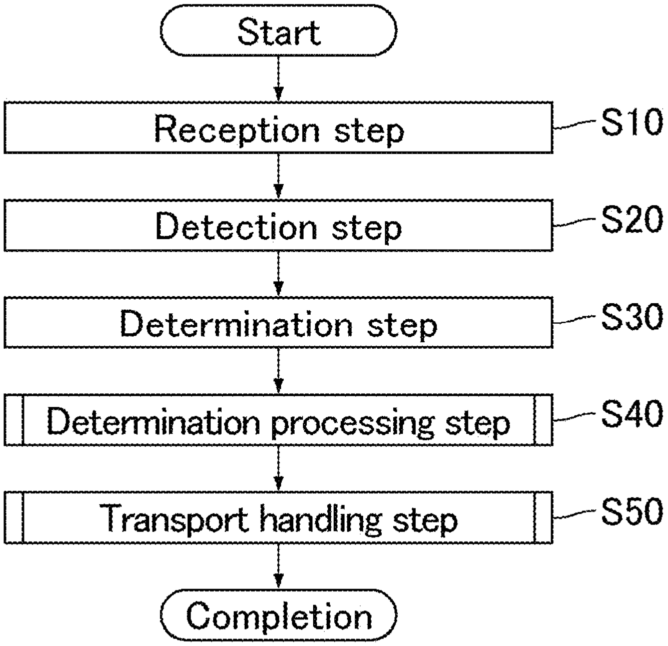
FIG. 13 is a flow chart illustrating a handling way of the coin handling device of Embodiment 1.

FIG. 13 is a flow chart illustrating a handling way of the coin handling device of Embodiment 1. As illustrated in FIG. 13, the coin handling device 1 successively performs or executes a reception step S10, a detection step S20, a determination step S30, a determination processing step S40, and a transport handling step S50, thereby handling a coin. The coin handling in the present embodiment includes, as processing or handling steps based on the handling settings, the determination processing step S40 and the transport handling step S50.

The reception step S10 is a step of receiving from an operating person a change in the handling settings that designate the way of handling a coin to be handled which is an indeterminate coin of which the type is not determined and for which multiple options of the type are extracted in the determination step S30 to be described later. In the reception step S10, the operation display 600 is used to receive from an operating person a change in the setting table relating to determination processing and a change in the setting table relating to transport handling. If no change is made in the contents of the handling settings, the reception step S10 may be skipped.

The detection step S20 is a step in which the detector 320 detects a feature of the coin to be handled.

The determination step S30 is a step in which the determiner 350 determines the type of the coin based on the feature of the coin acquired in the detection step S20. When the type of the coin to be handled is not determined in the determination step S30, the coin is determined as an indeterminate coin.

The determination processing step S40 is a step in which, when the determination result in the determination step S30 indicates an indeterminate coin, the determination processor 360 executes the determination processing on the indeterminate coin based on the setting table 342*a*.

Figure 14:
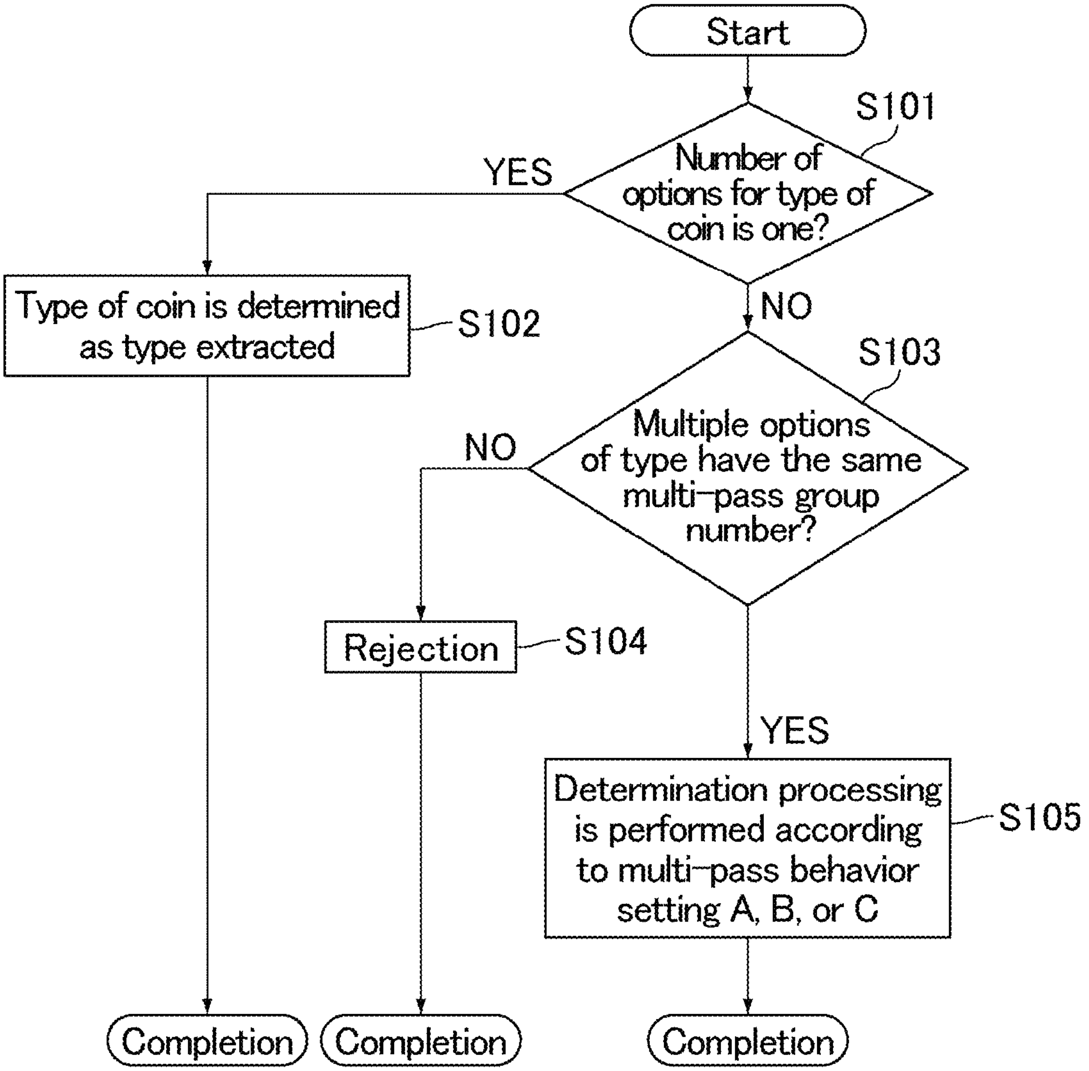
FIG. 14 is a flow chart illustrating the determination processing by the determination processor in the coin handling device of Embodiment 1.

FIG. 14 is a flow chart illustrating the determination processing by the determination processor in the coin handling device of Embodiment 1. The determination processor 360 executes the determination processing based on the flow chart illustrated in FIG. 14.

First, in a step S101, the determination processor 360 determines whether the number of options for the type of the coin is one or not. When the number of options for the type of the coin is one, the process proceeds to a step S102. The determination processor 360 treats the coin to be handled as a coin of the type mentioned as the option, completing the determination processing.

When the number of options for the type of the coin is not one, the process proceeds to a step S103. The determination processor 360 determines whether the multiple options of the type have the same multi-pass group number or not based on the determination table 342*a* relating to determination processing. When the multiple options of the type do not have the same multi-pass group number, the process proceeds to a step 104. The determination processor 360 determines the indeterminate coin as a coin to be rejected, completing the determination processing.

When the multiple options of the type have the same multi-pass group number, the process proceeds to a step S105. The determination processor 360 makes determination according to the multi-pass behavior setting A, B, or C based on the determination table 342*a* relating to determination processing, completing the determination processing.

The transport handling step S50 is a step in which the transport handling unit 200 performs the transport handling on the coin to be handled based on the setting table 342*b* relating to transport handling received in the reception step S10 and the determination result in the determination processing step S40.

Figure 15:
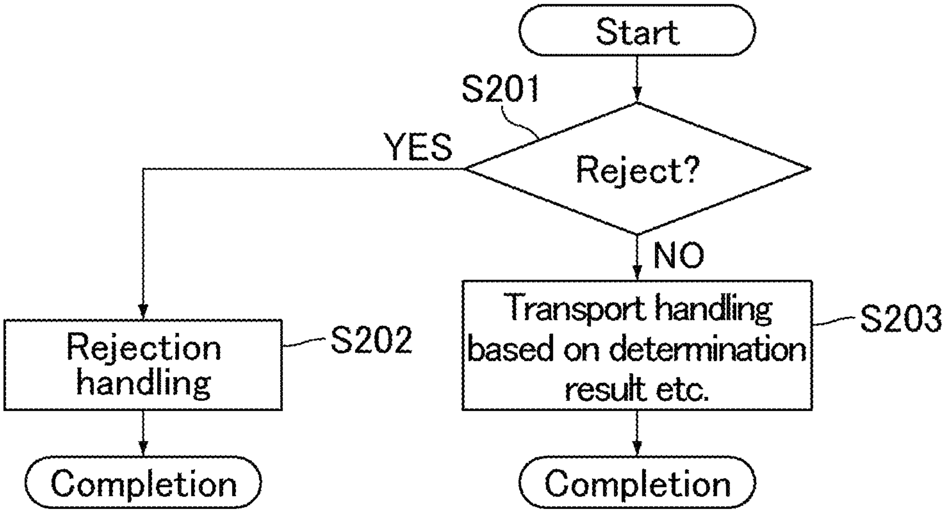
FIG. 15 is a flow chart illustrating the transport handling by the transport handling unit in the coin handling device of Embodiment 1.

FIG. 15 is a flow chart illustrating the transport handling by the transport handling unit in the coin handling device of Embodiment 1.

First, in a step S201, the transport handling unit 200 determines whether or not the determination result 343 indicates that the indeterminate coin is a coin to be rejected. In the case of a coin to be rejected, the process proceeds to a step S202. The transport handling unit 200 performs rejection handling on the indeterminate coin, completing the transport handling.

When the determination result 343 indicates that the indeterminate coin is not a coin to be rejected, the process proceeds to a step S203. The transport handling unit 200 performs transport handling on the indeterminate coin based on the determination result 343 and the setting table 342*b* relating to transport handling.

Figure 16:
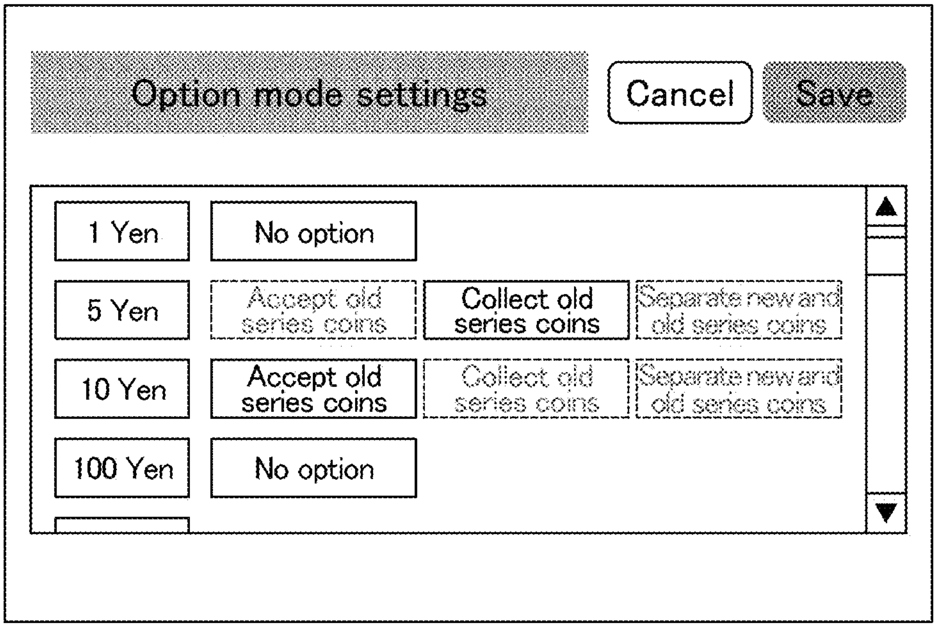
FIG. 16 is a diagram of an exemplary setting screen on a display when an operating person is to change handling settings.
Figure 17:
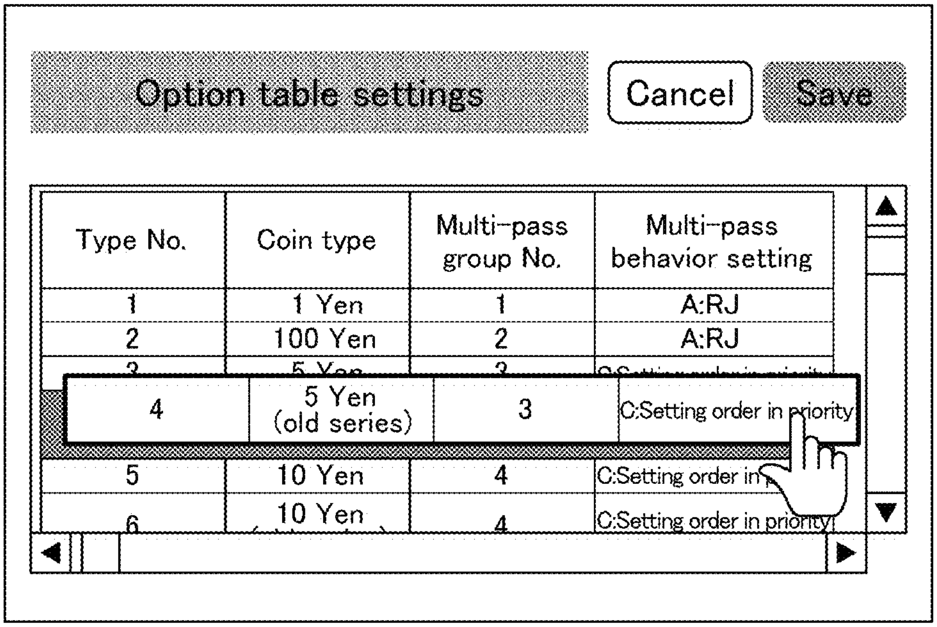
FIG. 17 is a diagram of another exemplary setting screen on a display when an operating person is to change handling settings.

FIG. 16 and FIG. 17 are each a diagram of an exemplary setting screen on a display when an operating person is to perform handling settings.

FIG. 16 is a diagram relating to option mode settings for setting the transport mode for coins. The way of transport handling on coins with multi-pass can be set for each denomination. For 10 yen coins and 5 yen coins of which both new series and old series coins circulate, the setting can be selected from the setting of accepting old series coins, the setting of collecting old series coins, and the setting of separating new series coins and old series coins. For 1 yen coins and 100 yen coins of which old series coins do not circulate, the "no option" setting is displayed. The scroll button on the right side of the screen enables scroll up and down of the setting screen.

The setting of the way of handling coins of each denomination with options displayed can be saved by pushing the "Save" button on the upper right of the screen, while the setting can be cancelled by pushing the "Cancel" button.

FIG. 17 is a diagram relating to option table settings for setting the setting table relating to determination processing. The option table settings enable changes of the multi-pass group number and the multi-pass behavior setting for each type. Further, any row of the setting items of a type with the multi-pass group number and the multi-pass behavior setting having been input may be moved in a drag-and-drop manner so that the order of the rows may be changed. As a result, for example, a type having a higher degree of priority can be placed at an upper row of the setting table. When the order of the rows is changed as described, the type numbers are automatically renumbered in ascending order from the top row to the bottom row.

As described above, the coin handling device 1 in the present embodiment can handle an indeterminate coin based on the handling settings received from an operating person through the operation display 600, and thus enables a simple and easy change of the way of handling a coin of which the type is difficult to determine according to the user needs.

In the present embodiment, the type numbers are sequentially assigned from the top row to the bottom tow in the setting tables, and thus a type placed at an upper row in each setting table has a higher degree of priority. Alternatively, the type numbers may not be sequentially assigned. In this case, the degree of priority of each type of coins are not determined by the position in the setting table but determined by the type number.

Figure 18:
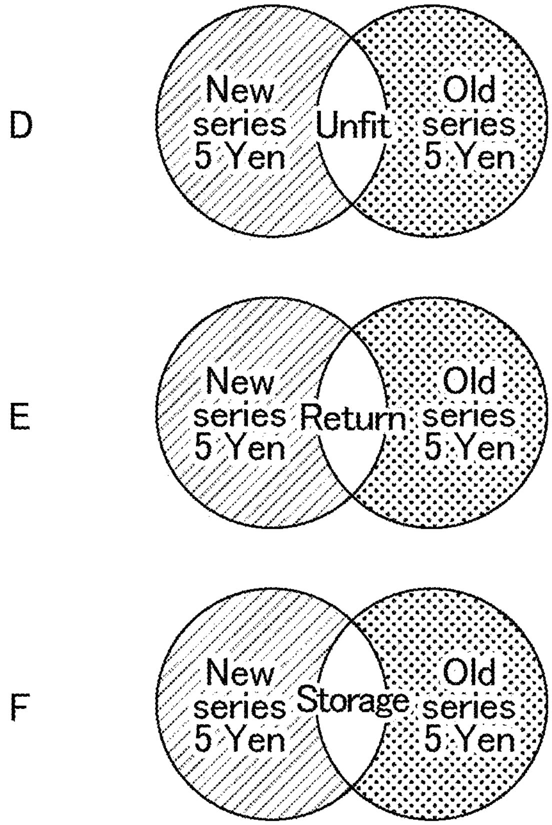
FIG. 18 is a diagram illustrating multi-pass behavior settings.

In the present embodiment, the multi-pass behavior settings A to C are described with reference to FIG. 2. Alternatively, a different behavior may be set in the multi-pass behavior setting. FIG. 18 is a diagram illustrating multi-pass behavior settings. Examples of the multi-pass behavior settings selected in the setting table 342*a* relating to determination processing include settings D to F as illustrated in FIG. 18. A multi-pass behavior setting D is a setting in which the determination processor 360 executes processing of determining an indeterminate coin as an unfit coin. A multi-pass behavior setting E is a setting in which the determination processor 360 executes processing of determining an indeterminate coin as a coin to be returned. A multi-pass behavior setting F is a setting in which the determination processor 360 executes processing of determining an indeterminate coin as a coin to be stored in a specific storage.

Figure 19:
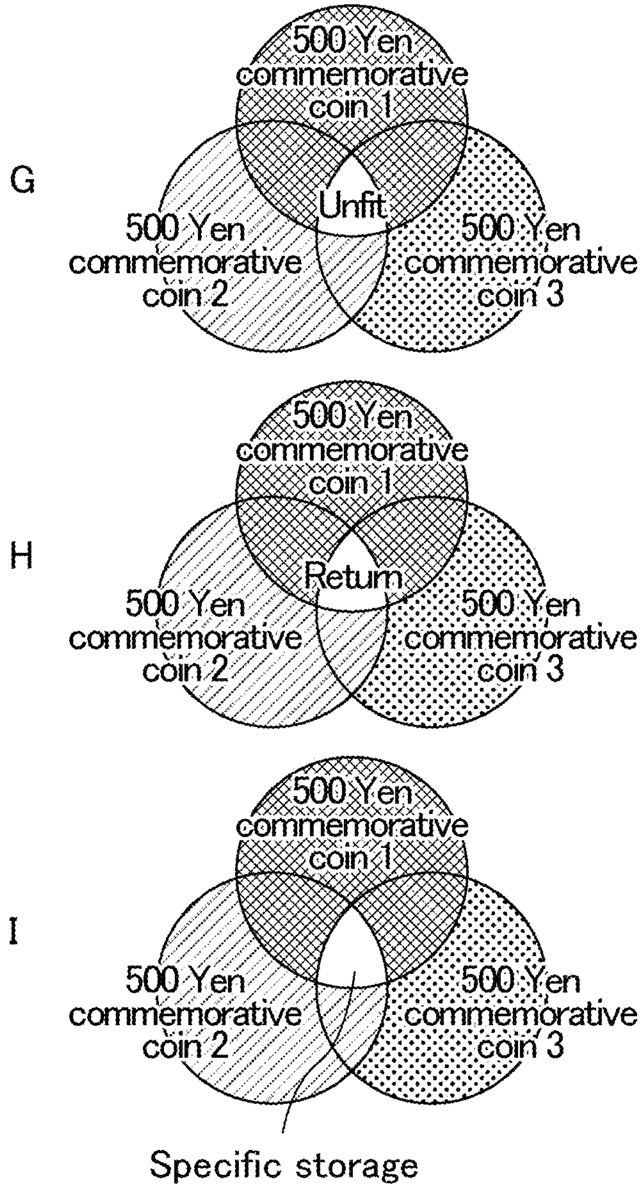
FIG. 19 is a diagram illustrating multi-pass behavior settings.

In the present embodiment, described is the case where the coin to be handled is an indeterminate coin for which two, new series and old series types are extracted as options. Alternatively, the coin to be handled may be an indeterminate coin for which three types may be extracted as options. In this case, examples of the multi-pass behavior settings include the settings illustrated in FIG. 19. FIG. 19 is a diagram illustrating multi-pass behavior setting. When the coin to be handled is an indeterminate coin for which three types of 500-yen commemorative coins (referred to as commemorative coins 1, 2, and 3) are extracted, a multi-pass behavior setting G illustrated in FIG. 19 is a setting in which the determination processor 360 executes processing of determining an indeterminate coin as an unfit coin. A multi-pass behavior setting H is a setting in which the determination processor 360 executes processing of determining an indeterminate coin as a coin to be returned. A multi-pass behavior setting I is a setting in which the determination processor 360 executes processing of determining an indeterminate coin as a coin to be stored in a specific storage. FIG. 19 also illustrates the cases where the coin to be handled is an indeterminate coin for which two options of the type are extracted. For example, when the 500-yen commemorative coins 1 and 2 are extracted as options in the multi-pass behavior setting G, the determination processor 360 is set to execute processing of determining an indeterminate coin as a 500-yen commemorative coin 1.

In the present embodiment, described is the case where the magnetic sensor and the image sensor are used as the sensors 321. Alternatively, only the magnetic sensor may be used as the sensor. FIG. 20 is a diagram of part of another exemplary type information table. FIGS. 21 and 22 are each a diagram of part of still another exemplary setting table relating to determination processing. For the cases where only the magnetic sensor is used as the sensor 321, FIG. 20 illustrates an exemplary type information table, and FIGS. 21 and 22 illustrate exemplary setting tables relating to determination processing.

Embodiment 2

In the present embodiment, features unique to the present embodiment are mainly described, and the same contents as those in Embodiment 1 will not be elaborated upon here. The components having a similar or the same function in both the present embodiment and Embodiment 1 are provided with the same reference sign, and these components will not be elaborated upon in the present embodiment.

Figure 23:
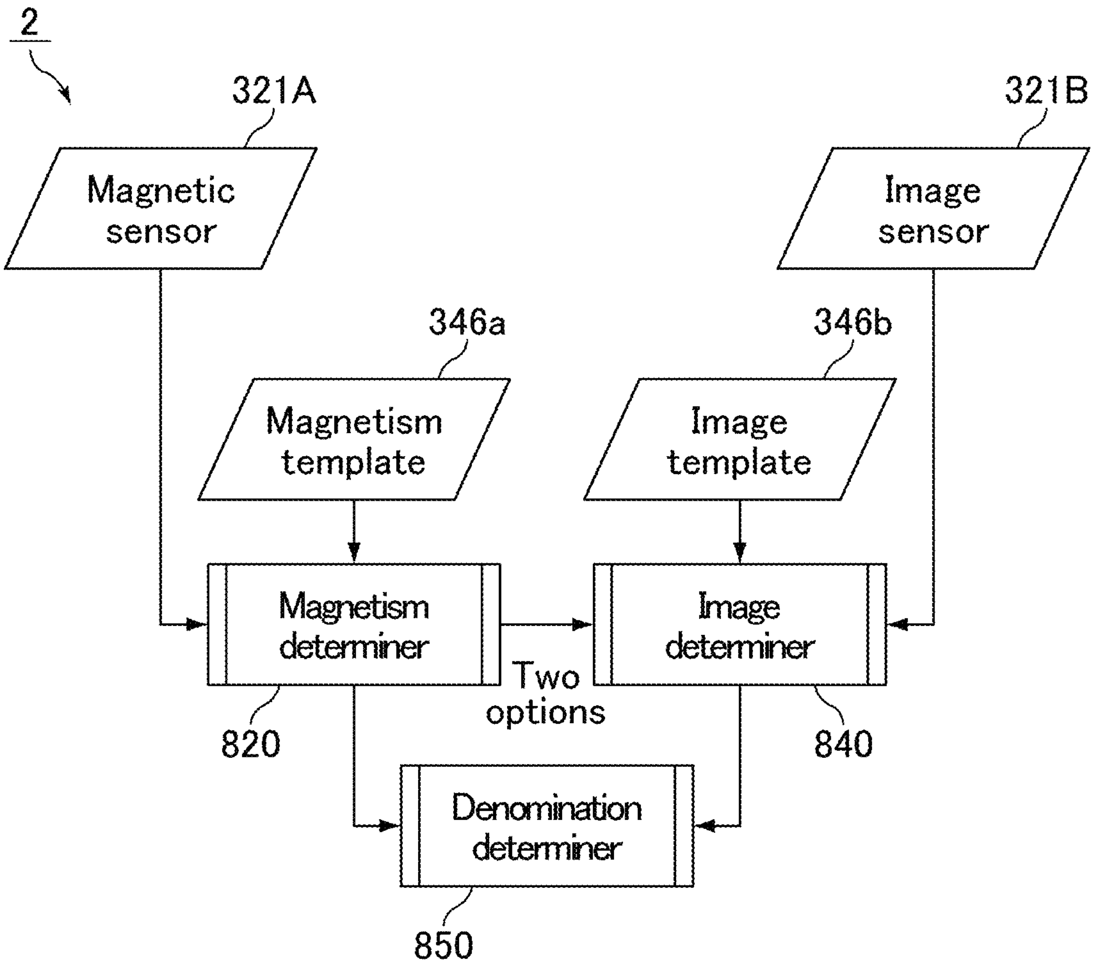
FIG. 23 is a block diagram of an internal structure of a coin recognition device of Embodiment 2.

FIG. 23 is a block diagram of an internal structure of a coin recognition device of Embodiment 2. As illustrated in FIG. 23, a coin recognition device 2 of Embodiment 2 includes the magnetic sensor 321A that detects a magnetic feature of a coin, a magnetism determiner 820 that determines multiple options of a type of the coin based on the magnetic feature of the coin detected by the magnetic sensor 321A, the image sensor 321B that images a surface of the coin, and an image determiner 840 that determines the type of the coin among the multiple options determined by the magnetism determiner 820 based on the image of the coin imaged by the image sensor 321B. Such an embodiment can narrow the types of the coin down to multiple options based on the output from the magnetic sensor 321A and can narrow the multiple options limited by the image sensor 321B down to the single type.

A coin recognition device is awaited that can deal with expected recoining although nobody can know what magnetic feature the recoined one has. A conventional coin recognition device utilizes a magnetic sensor to execute processing of determining a coin to be handled as a coin of a single type, and then utilizes an image sensor to determine the type of the coin based only on the determination result from the magnetic sensor (i.e., the single type coin). Thus, for example, recoining may cause such a conventional coin recognition device to fail to determine the type of coins with a magnetic sensor. In this case, what the coin recognition device can do is only to reject the coins so as to prevent misrecognition, which may cause a failure in meeting the reception rate the coin recognition device needs to have.

The coin recognition device 2 in the present embodiment includes the image determiner 840 that determines the type of a coin among the multiple options determined by the magnetism determiner 820. Thus, even when the magnetic sensor 321A cannot determine the type of the coin, the image determiner 840 can determine the type because the coins necessarily have different patterns. As a result, the coin recognition device 2 does not need to reject the coins for prevention of misrecognition, achieving an improved reception rate. If factors such as the processing time and the memory allow, the coin recognition device 2 can also determine the authenticity of coins having the same magnetic feature and different patterns, such as commemorative coins of local governments, using the image sensor 321B.

As illustrated in FIG. 23, the coin recognition device 2 in the present embodiment further includes a denomination determiner 850 that determines the type of a coin based on the multiple options from the magnetism determiner 820 and the determination result from the image determiner 840. The magnetism determiner 820 compares the magnetism data acquired by the magnetic sensor 321A with the magnetism template 346*a* and extracts multiple options (two types, in FIG. 23). The image determiner 840 compares the respective image templates 346*b* corresponding to the multiple options extracted by the magnetism determiner 820 with the image data acquired by the image sensor 321B, and determines the type of the coin among the multiple options acquired by the magnetism determiner 820. The denomination determiner 850 integrates the multiple options from the magnetism determiner 820 and the determination result from the image determiner 840, finally determining the type of the coin.

As described hereinabove, preferred embodiments of the present invention are described with reference to the drawings. Still, the above embodiments are not intended to limit the present invention. The structures of the embodiments may be combined or modified as appropriate within the spirit of the present invention.

INDUSTRIAL APPLICABILITY

As described above, the present invention provides a technique useful for simply and easily changing a way of handling a coin in a coin handling device according to the user needs.

REFERENCE SIGNS LIST

1: coin handling device
2: coin recognition device
3: housing
10: controller
12: printer
14: communicator
20: external device
21*a*: transport belt
21*b*: transport pin
22*a*: imaging area
24: imaging element
100: coin
101: front surface
200: transport handling unit
201: coin inlet
203: coin selector
204: coin temporary storage
205: coin storage
206: rejecter
207: return box
208: coin transporter
209: dispensing recognizer
210: dispensing box
211: collector
212: wrapper
212*a*: wrapping switcher
220: bag
230: coin roll storage
230*a*: coin roll tray
231: coin roll dispenser
231*a*: shutter
232: coin roll gathering box
233: coin roll outlet
234: coin roll transporter
300: recognizer
310: recognition communicator
320: detector
321: sensor
321A: magnetic sensor
321B: image sensor
321U: sensor unit
330: recognition controller
331: input/output controller
332: setting controller
333: sensor controller
334: sensor data acquirer
340: recognition storage
341: type information table
342*a*, 342*b*: setting table
343: determination result
344: option extraction result
345: sensor data
346*a*: magnetism template
346*b*: image template
350: determiner
360: determination processor
600: operation display
600*a*: operator
600*b*: display
700: storage
820: magnetism determiner
840: image determiner
850: denomination determiner

What is claimed is:

1. A coin handling device comprising:
a detector that detects a feature of a coin;
templates;
a determiner that is configured to calculate degrees of similarity based on comparison between the feature of the coin detected by the detector and each of the templates and determines a type of the coin based on the degrees of similarity calculated;
a receptor that is configured to receive from an operating person handling settings that designate a way of handling the coin that is an indeterminate coin of which the type is not determined and for which multiple options of the type are extracted by the determiner because multiple degrees of similarity are higher than a predetermined threshold; and
a handler that is configured to handle the indeterminate coin based on the handling settings received by the receptor,
wherein the handling settings include a first setting item that designates the indeterminate coin as a coin to be subjected to rejection handling, a second setting item that designates the indeterminate coin as a coin of a type having a highest degree of similarity calculated by the determiner among the multiple options of the type, and a third setting item that designates a degree of priority of the type of the indeterminate coin,
wherein the receptor is configured to receive one of the first, second, and third setting items from the operating person, and
wherein based on the setting item received by the receptor, the handler is configured to: perform the rejection handling on the indeterminate coin based on the first setting item; handle the indeterminate coin as a coin of the type having the highest degree of similarity calculated by the determiner among the multiple options of the type based on the second setting item; or determine the indeterminate coin as a coin of a type having a highest degree of priority among the multiple options of the type based on the third setting item and handle the indeterminate coin as a coin of the determined type.

2. The coin handling device according to claim 1,
wherein the detector includes a magnetic sensor that detects a magnetic feature of the coin.

3. The coin handling device according to claim 1,
wherein the detector includes an image sensor that detects an optical feature of the coin.

4. The coin handling device according to claim 1,
wherein the type includes at least one of a denomination, an uneven structure on a surface of the coin, or a material, and
wherein the multiple options of the type have the same denomination and have difference in at least one of the uneven structure on the surface of the coin or the material.

5. The coin handling device according to claim 1,
wherein the type includes at least one of a denomination, an uneven structure on a surface of the coin, or a material, wherein the multiple options of the type are a rare type and a non-rare type that is equal in denomination to the rare type and is not equal in at least one of the uneven structure on the surface of the coin or the material to the rare type, wherein the handling settings include a setting item that designates a transport destination of the indeterminate coin to a transport destination of a coin of the non-rare type, and wherein the handler performs handling of transporting the indeterminate coin to the same transport destination as that of a coin of the non-rare type.

6. The coin handling device according to claim 1, wherein the type includes at least one of a denomination, an uneven structure on a surface of the coin, or a material, wherein the multiple options of the type are a rare type and a non-rare type that is equal in denomination to the rare type and is not equal in at least one of the uneven structure on the surface of the coin or the material to the rare type, wherein the handling settings include a setting item that designates a transport destination of the indeterminate coin to a transport destination different from that of a coin of the non-rare type, and wherein the handler performs handling of transporting the indeterminate coin to the transport destination different from that of a coin of the non-rare type.

7. A coin handling method comprising:

detecting a feature of a coin;

providing templates;

calculating degrees of similarity based on comparison between the feature of the coin detected in the detecting and each of the templates and determining a type of the coin based on the degrees of similarity calculated;

receiving from an operating person handling settings that designate a way of handling the coin that is an indeterminate coin of which the type is not determined and for which multiple options of the type are extracted in the determining because multiple degrees of similarity are higher than a predetermined threshold; and handling the indeterminate coin based on the handling settings received in the receiving, wherein the handling settings includes a first setting item that designates the indeterminate coin as a coin to be subjected to rejection handling, a second setting item that designates the indeterminate coin as a coin of a type having a highest degree of similarity calculated in the determining among the multiple options of the type, and a third setting item that designates a degree of priority of the type of the indeterminate coin, wherein the receiving includes receiving one of the first, second, and third setting items from the operating person, and wherein based on the setting item received in the receiving, the handling includes: performing the rejection handling on the indeterminate coin based on the first setting item; handling the indeterminate coin as a coin of the type having the highest degree of similarity calculated in the determining among the multiple options of the type based on the second setting item; or determining the indeterminate coin as a coin of a type having a highest degree of priority among the multiple options of the type based on the third setting item and handling the indeterminate coin as a coin of the determined type.

* * * * *